(12) United States Patent
Lim et al.

(10) Patent No.: US 11,912,625 B2
(45) Date of Patent: Feb. 27, 2024

(54) COMPOSITION FOR FDM 3D PRINTER, METHOD OF MANUFACTURING THE SAME, AND MOLDED ARTICLE

(71) Applicants: CG Bio Co., Ltd., Seongnam-si (KR); BIOALPHA CORPORATION, Seoul (KR)

(72) Inventors: Jun Young Lim, Seoul (KR); Yong Bok Kim, Gwangju-si (KR); Hyun Seung Ryu, Yongin-si (KR)

(73) Assignees: CG Bio Co., Ltd., Seongnam-si (KR); BIOALPHA CORPORATION, Seoul (KR)

( * ) Notice: Subject to any disclaimer, the term of this patent is extended or adjusted under 35 U.S.C. 154(b) by 496 days.

(21) Appl. No.: 16/710,046

(22) Filed: Dec. 11, 2019

(65) Prior Publication Data
US 2021/0024420 A1    Jan. 28, 2021

(30) Foreign Application Priority Data

Jul. 25, 2019 (KR) .......................... 10-2019-0090063

(51) Int. Cl.
*C04B 35/22* (2006.01)
*B28B 1/00* (2006.01)
(Continued)

(52) U.S. Cl.
CPC .............. *C04B 35/22* (2013.01); *B28B 1/001* (2013.01); *C04B 35/6346* (2013.01); *C04B 35/64* (2013.01); *B33Y 10/00* (2014.12); *B33Y 70/10* (2020.01); *B33Y 80/00* (2014.12); *C04B 2235/365* (2013.01); *C04B 2235/6026* (2013.01); *C04B 2235/612* (2013.01); *C04B 2235/665* (2013.01); *C04B 2235/96* (2013.01)

(58) Field of Classification Search
CPC ......... B33Y 10/00; B33Y 80/00; B33Y 70/00; B33Y 70/10; C04B 2235/365; C04B 2235/6026; C04B 2235/612; C04B 2235/665; C04B 2235/96; B28B 1/001
See application file for complete search history.

(56) References Cited

U.S. PATENT DOCUMENTS 10,981,326 B1 * 4/2021 Pugh ..................... B29C 64/264
2008/0153973 A1 * 6/2008 Ittel ........................ C09D 11/02
524/612

(Continued)

FOREIGN PATENT DOCUMENTS

EP      3315466 A1 *  6/2016  ............. B33Y 10/00
JP   H10309297 A  * 11/1998  ............. B29C 64/00
(Continued)

OTHER PUBLICATIONS

Yongbok Kim et al., "3D-printed PCL/bioglass (BGS-7) composite scaffolds with high toughness and cell-responses for bone tissue regeneration", Journal of Industrial and Engineering Chemistry, Nov. 25, 2019, pp. 163-171, vol. 79.

*Primary Examiner* — Nahida Sultana
(74) *Attorney, Agent, or Firm* — Sughrue Mion, PLLC

(57) ABSTRACT

A composition for a FDM 3D printer is disclosed. The composition contains bioglass and a biocompatible polymer resin. In addition, a FDM 3D printer molded article having a laminated strut structure, in which the composition for the FDM 3D printer is injected into four layers, is disclosed.

2 Claims, 20 Drawing Sheets

Specification includes a Sequence Listing.

(51) Int. Cl.
 *C04B 35/634* (2006.01)
 *C04B 35/64* (2006.01)
 *B33Y 10/00* (2015.01)
 *B33Y 80/00* (2015.01)
 *B33Y 70/10* (2020.01)

(56) References Cited

U.S. PATENT DOCUMENTS

| | | | | |
|---|---|---|---|---|
| 2011/0130290 | A1* | 6/2011 | Borros Gomez | C08K 3/38 |
| | | | | 424/605 |
| 2016/0023373 | A1* | 1/2016 | Demuth | C04B 35/62227 |
| | | | | 524/427 |
| 2016/0128837 | A1* | 5/2016 | Juszczyk | B28B 1/008 |
| | | | | 156/154 |
| 2016/0175929 | A1* | 6/2016 | Colin | B22F 1/065 |
| | | | | 219/76.12 |
| 2017/0354501 | A1* | 12/2017 | Jie | A61L 27/58 |
| 2018/0154580 | A1* | 6/2018 | Mark | B22F 5/10 |
| 2018/0298215 | A1 | 10/2018 | Andersen et al. | |
| 2018/0354860 | A1* | 12/2018 | Wang | C04B 35/5805 |
| 2019/0203038 | A1* | 7/2019 | Kengla | A61L 27/46 |
| 2020/0024465 | A1* | 1/2020 | Dylla-Spears | B33Y 70/10 |

FOREIGN PATENT DOCUMENTS

| | | |
|---|---|---|
| KR | 1020160059302 A | 5/2016 |
| KR | 10-2016-0094803 A | 8/2016 |
| KR | 1020180064515 A | 6/2018 |
| KR | 10-2018-0128227 A | 12/2018 |
| KR | 10-1912839 B1 | 12/2018 |
| KR | 1020190000579 A | 1/2019 |
| KR | 1020190109613 A | 9/2019 |

\* cited by examiner

[Fig. 1A]
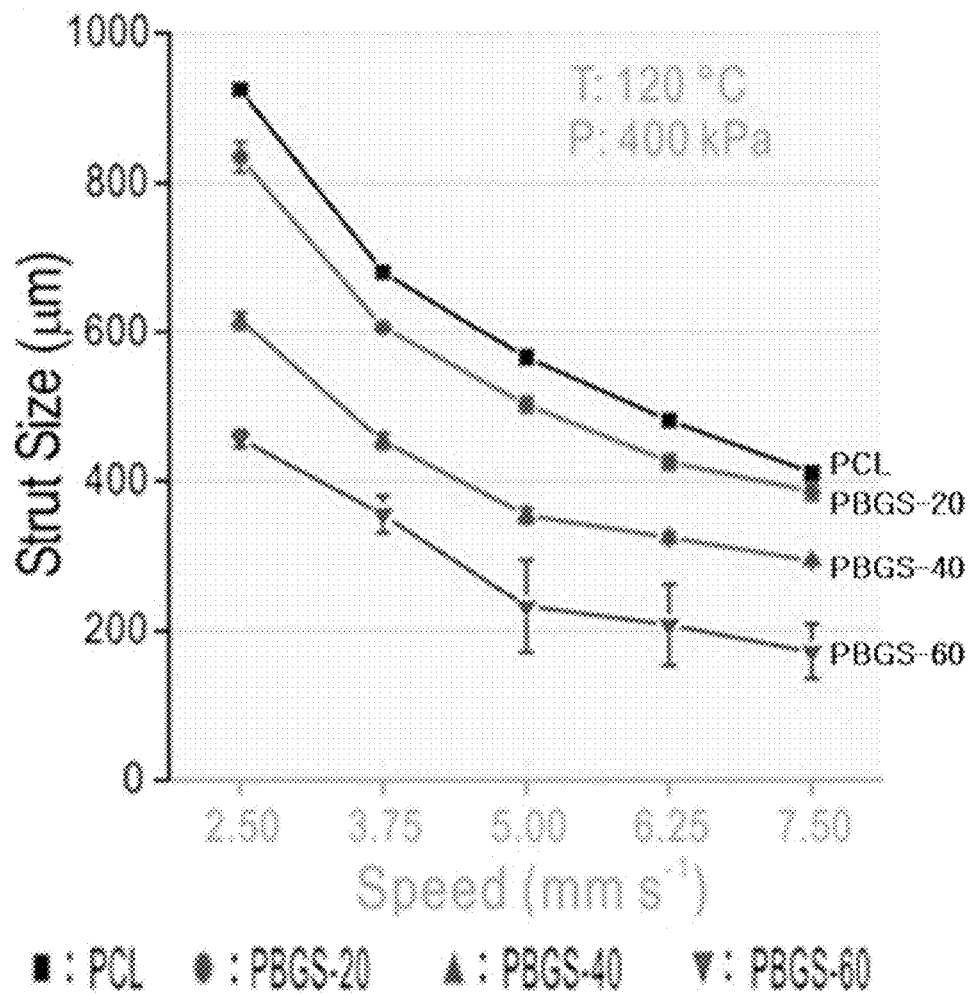

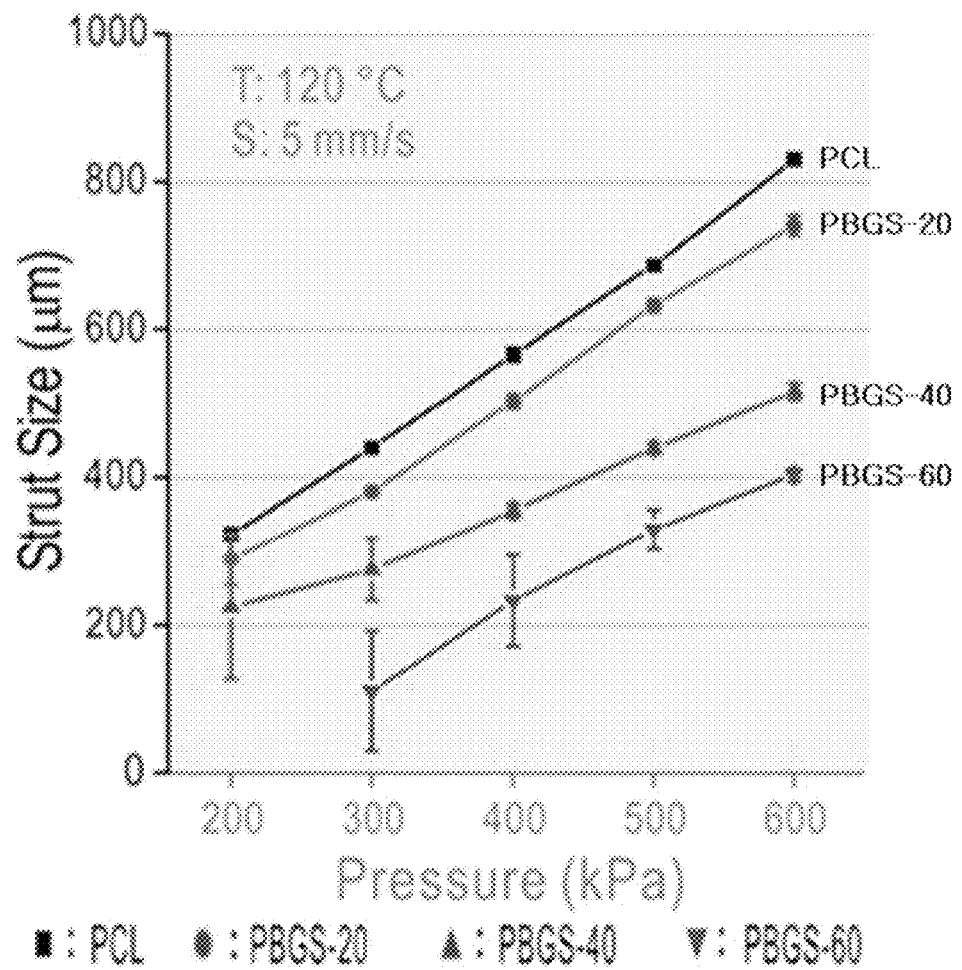
[Fig. 1B]

[Fig. 1C]
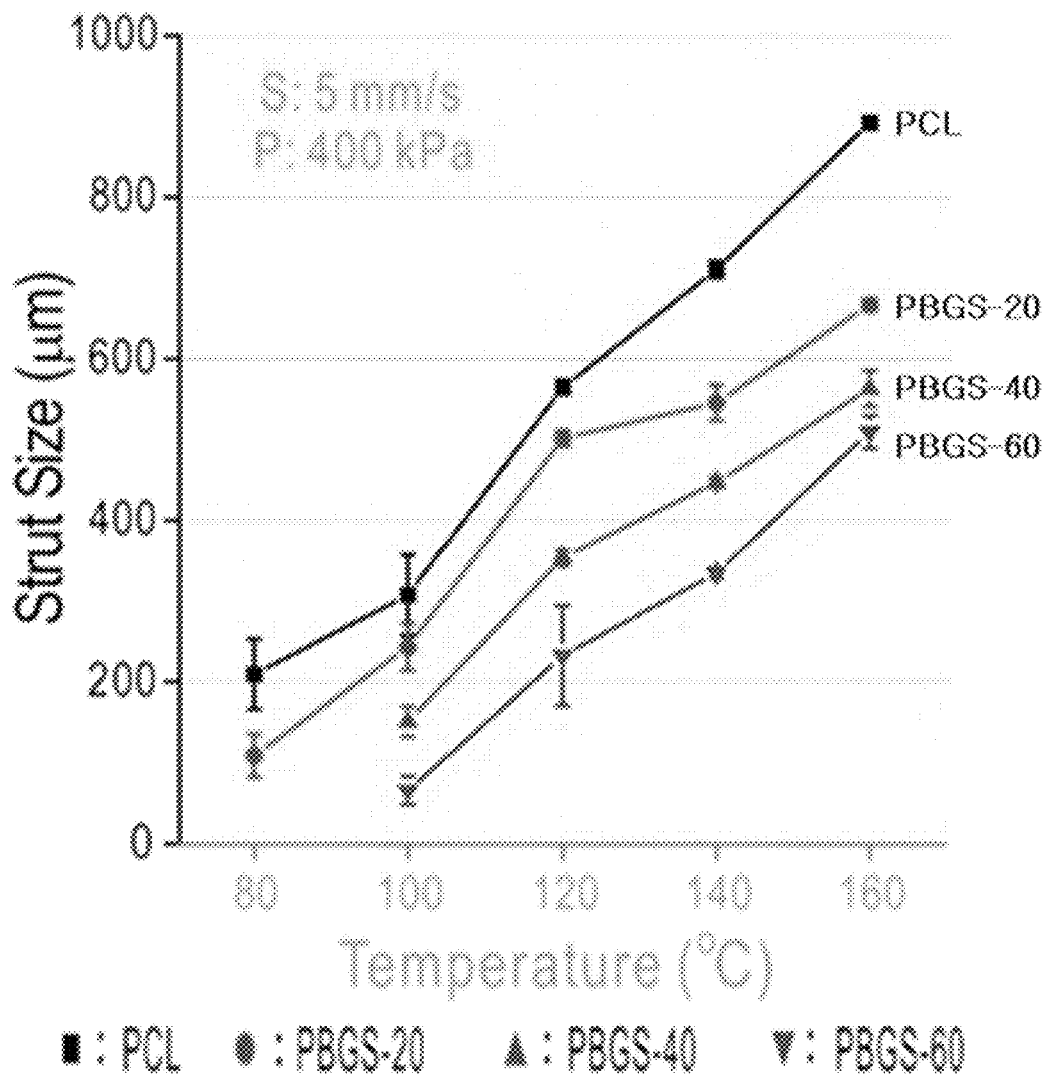

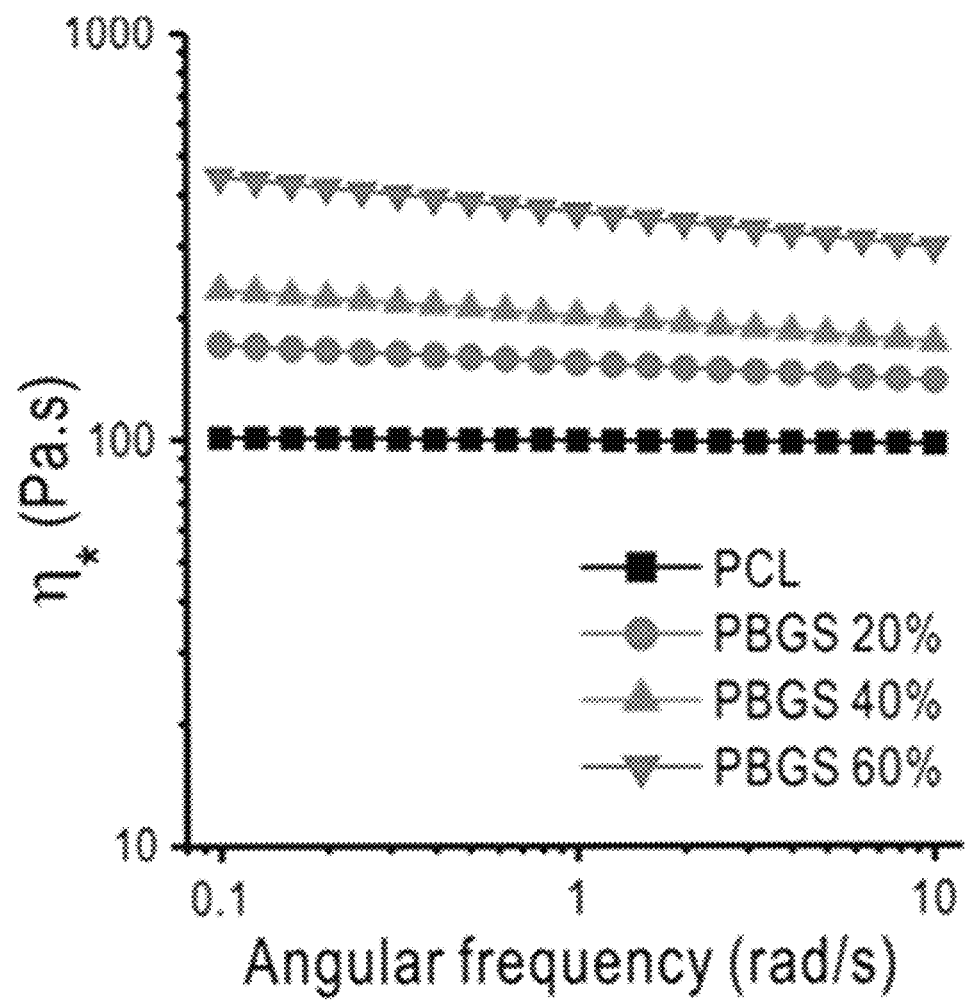
[Fig. 1D]

[Fig. 2]
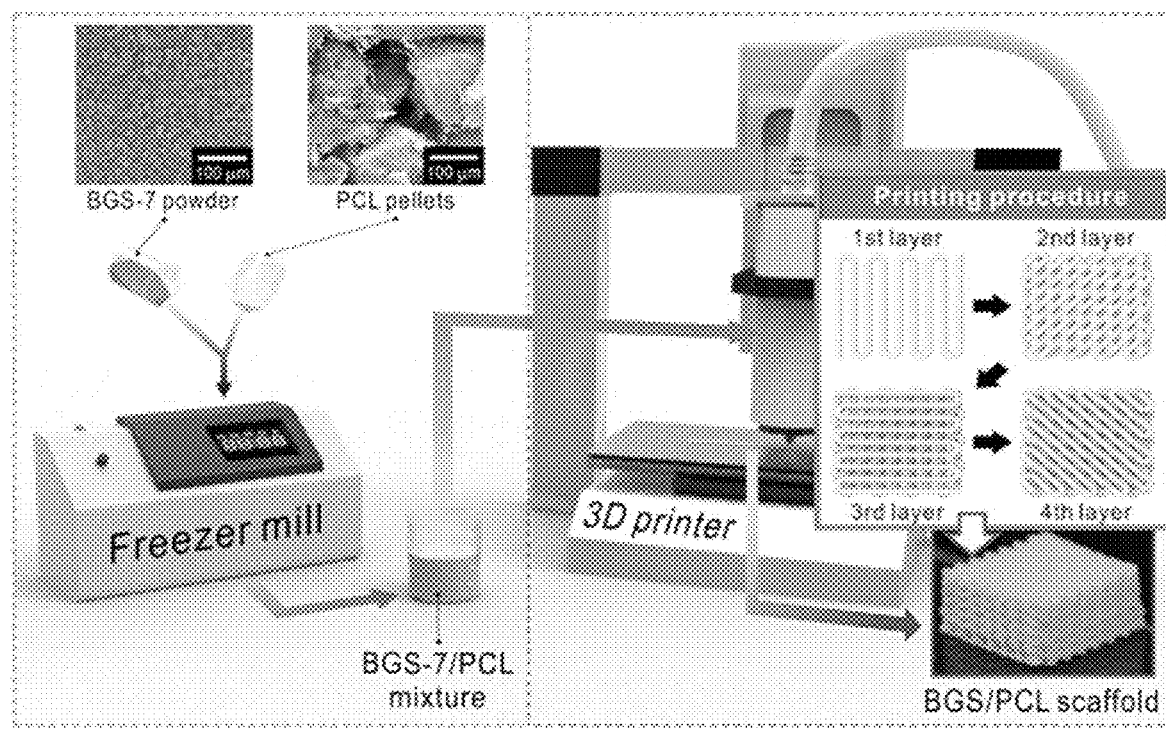

[Fig. 3]
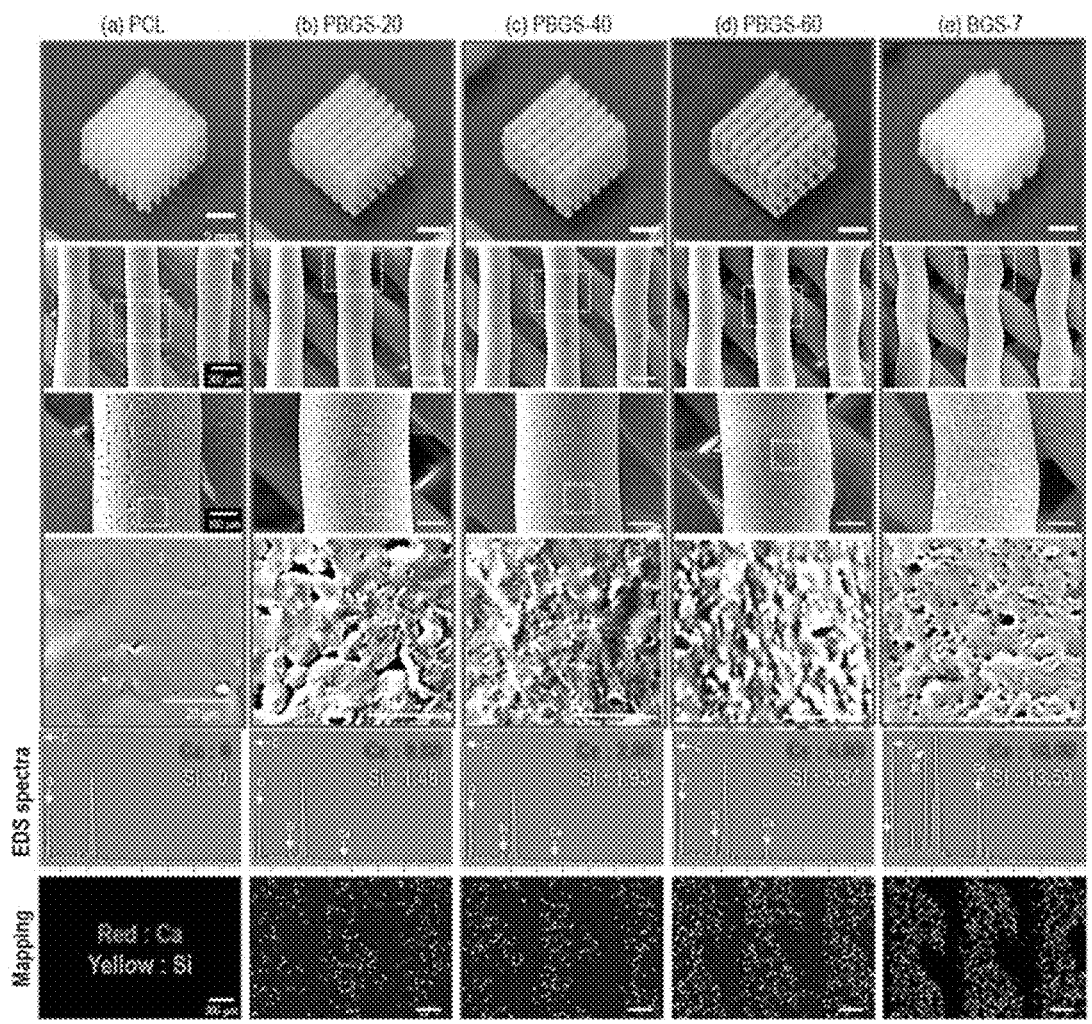

[Fig. 4]
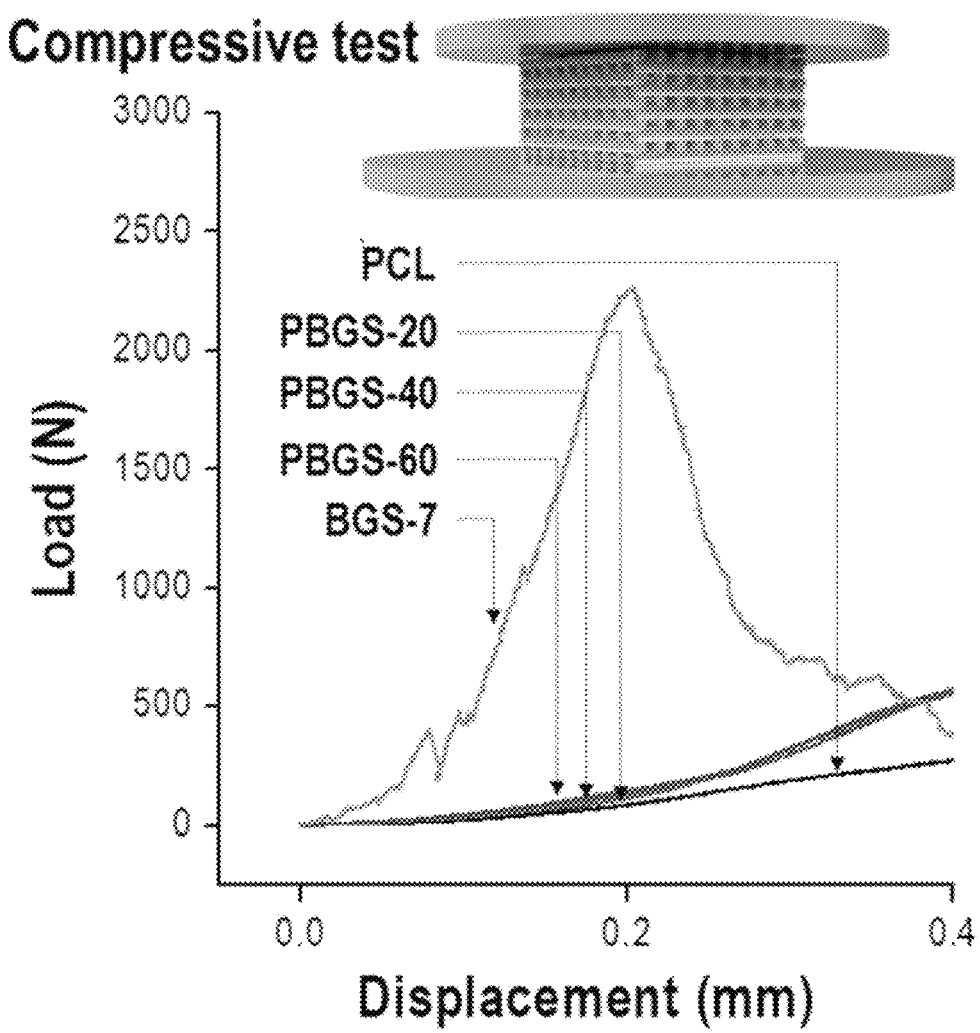

[Fig. 5]
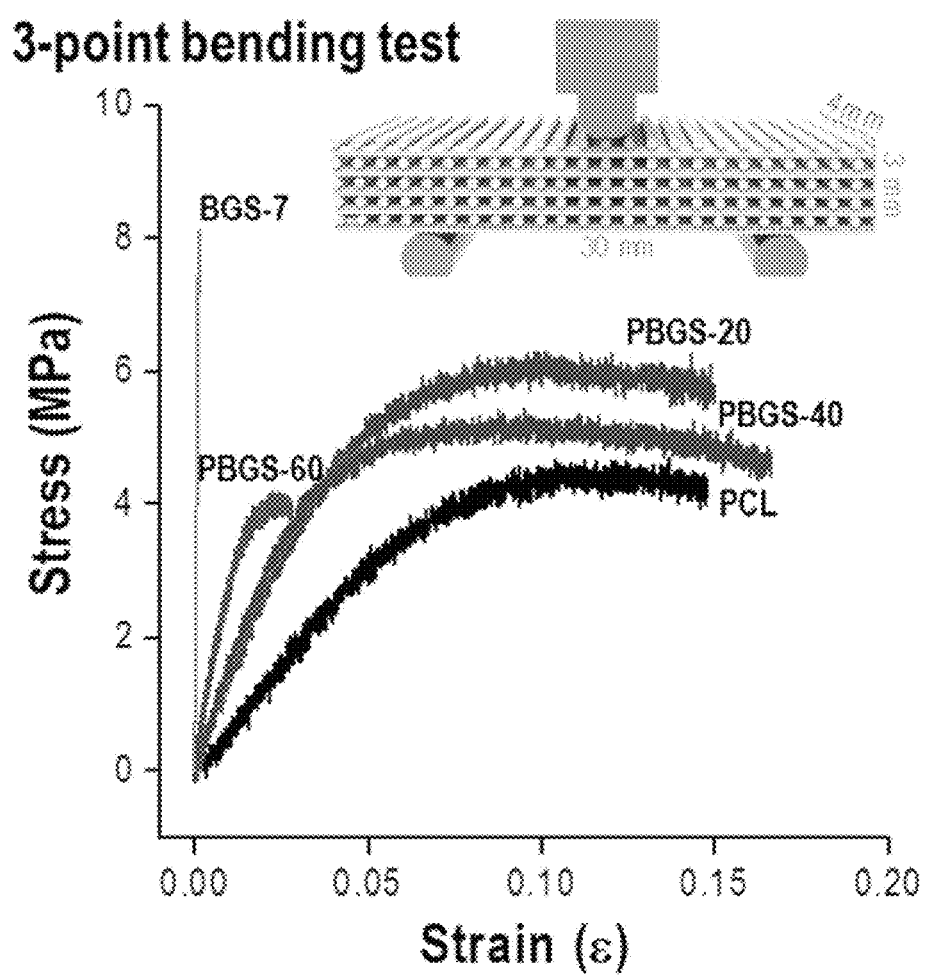

[Fig. 6]
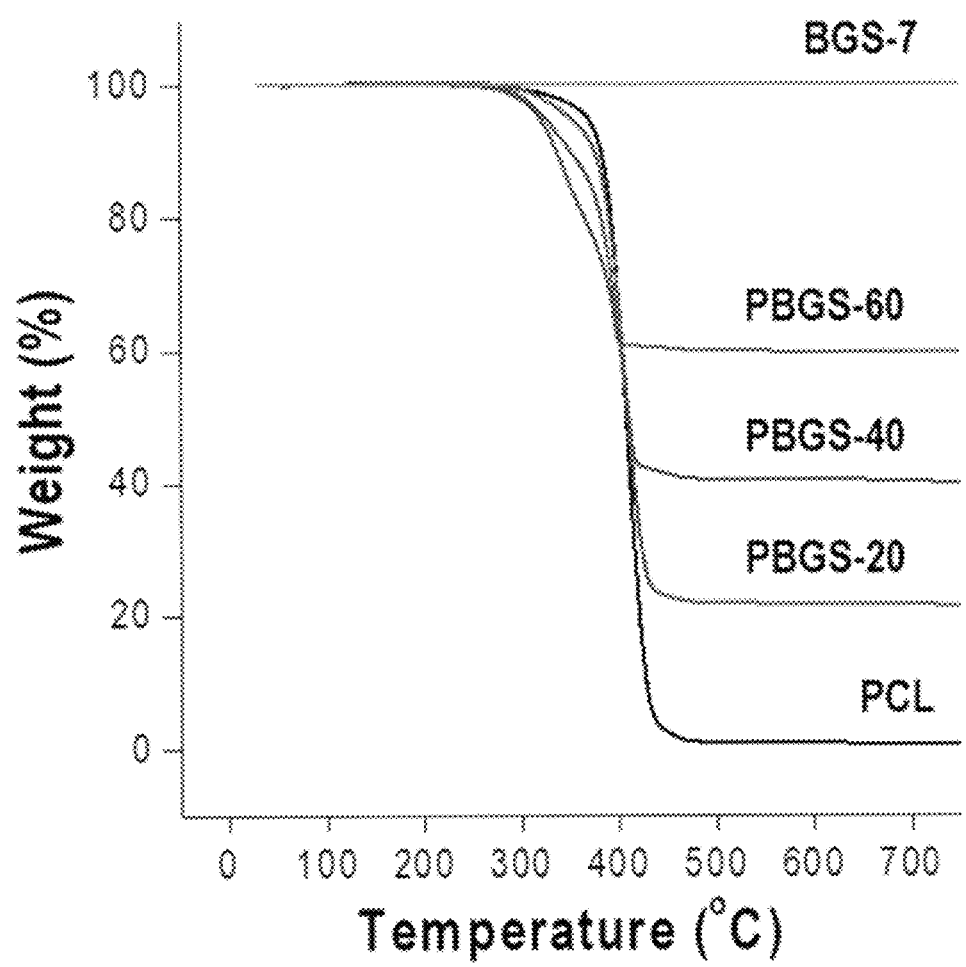

[Fig. 7]
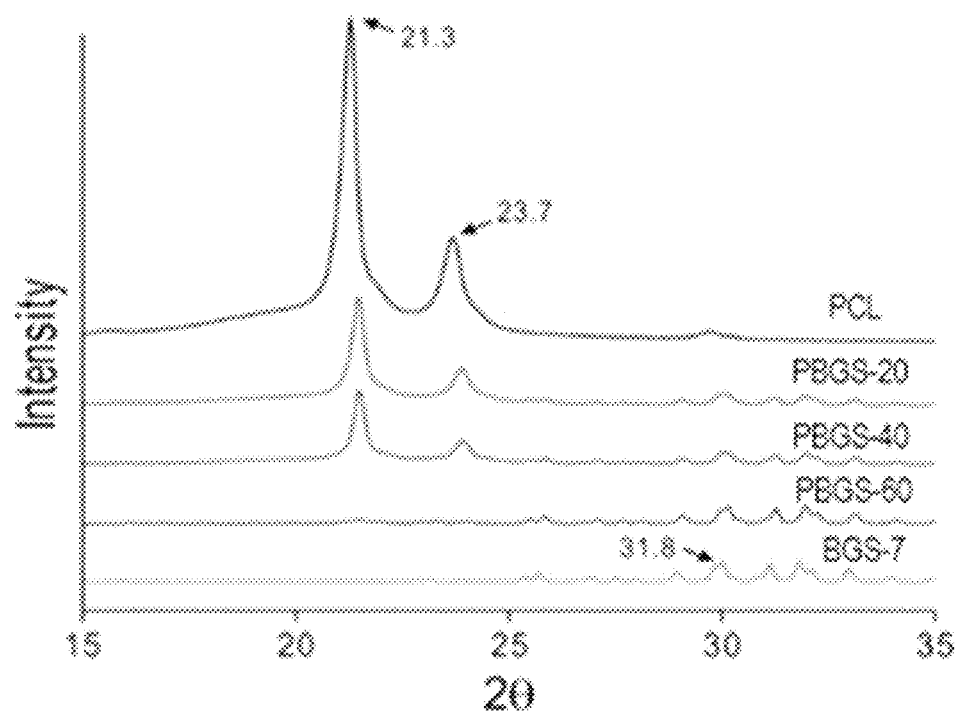

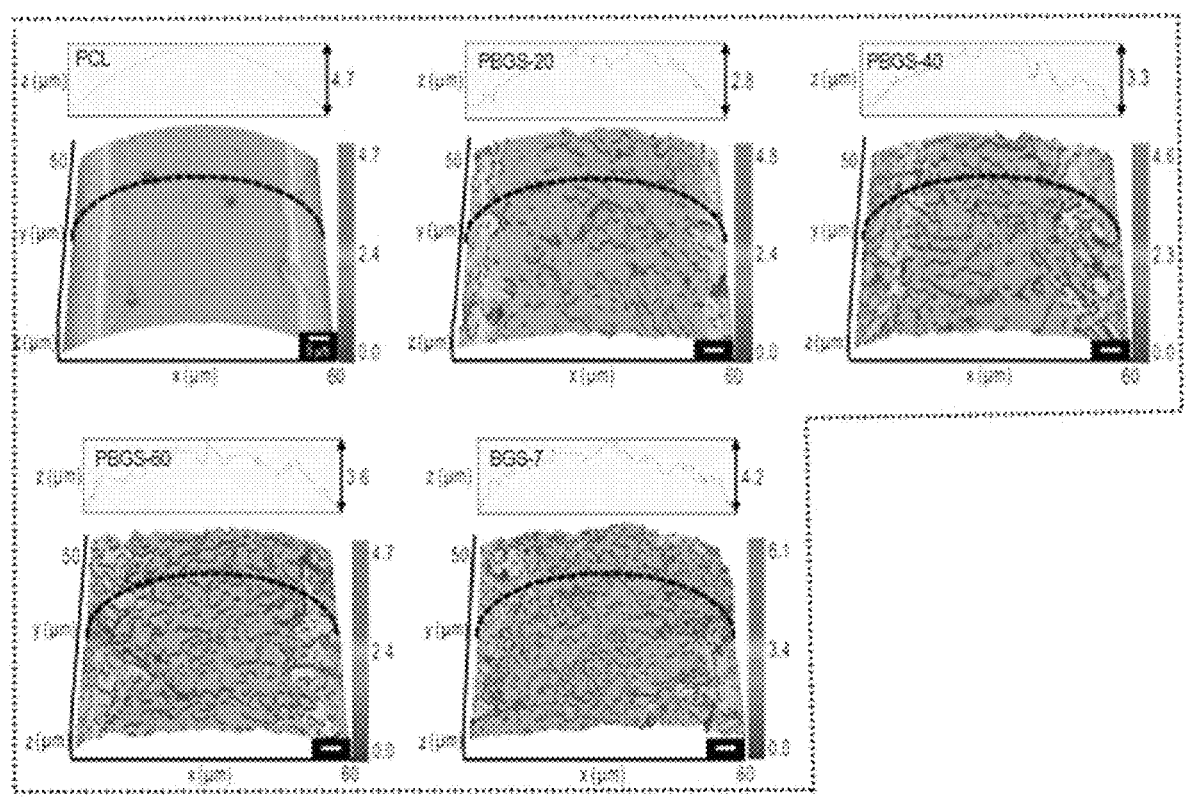
[Fig. 8A]

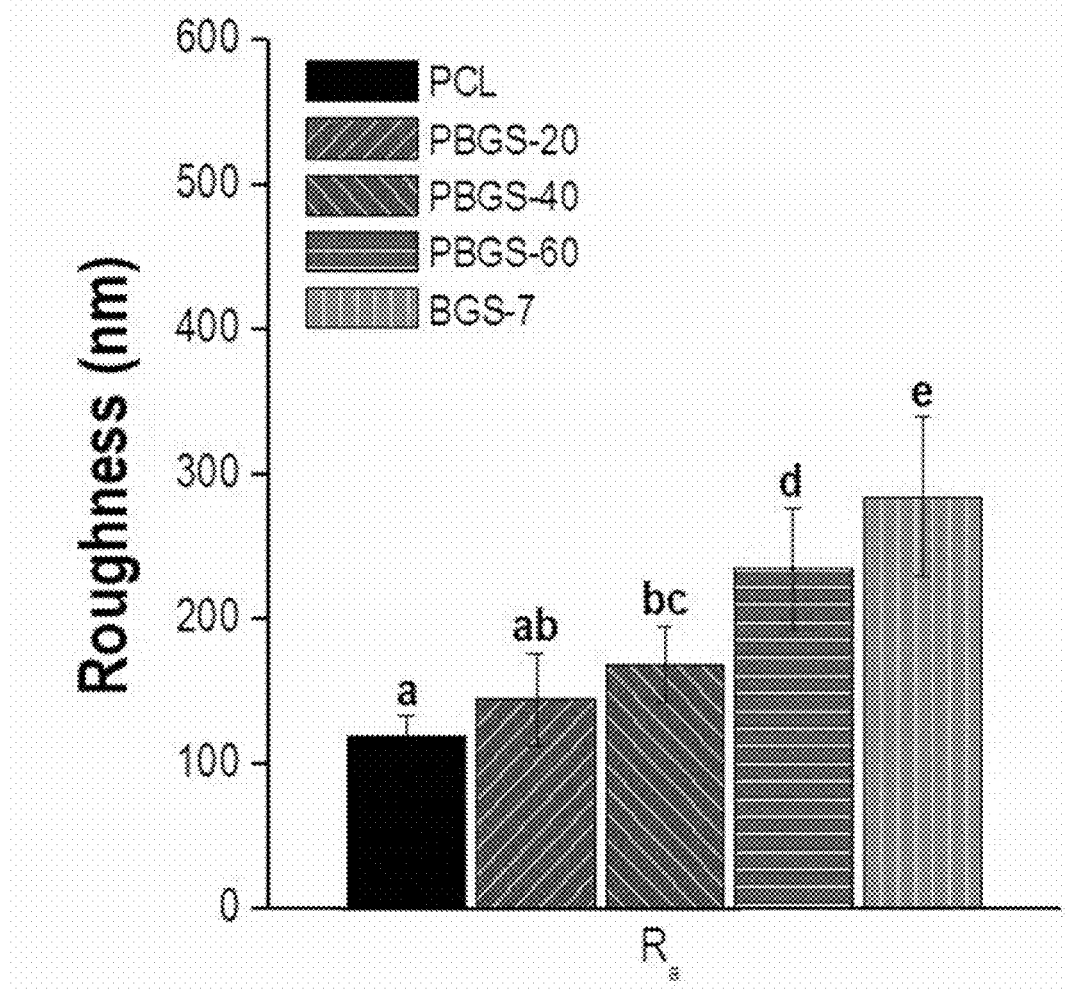
[Fig. 8B]

[Fig. 9]
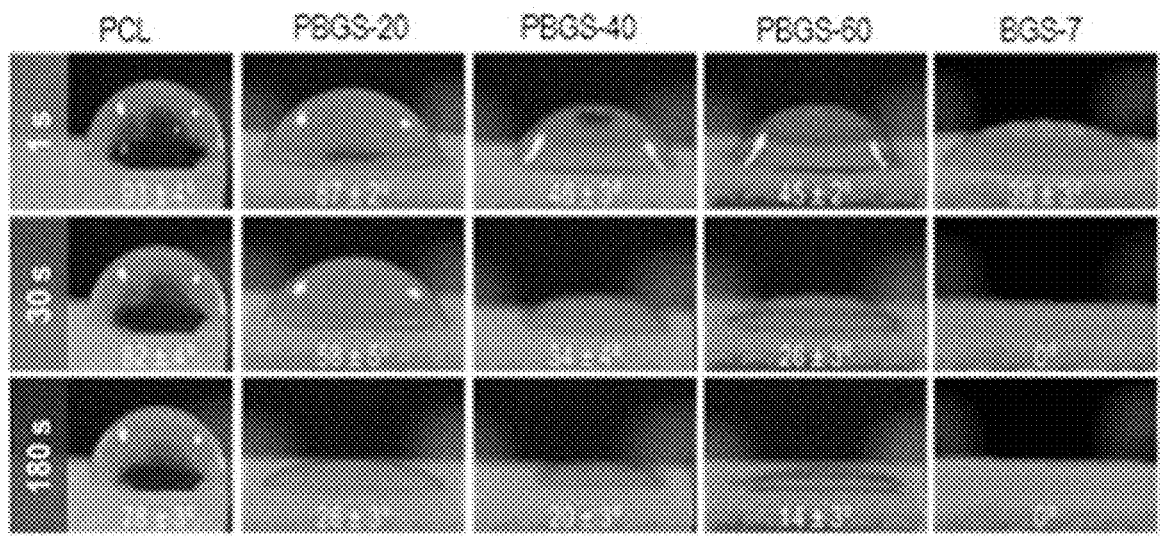

[Fig. 10]
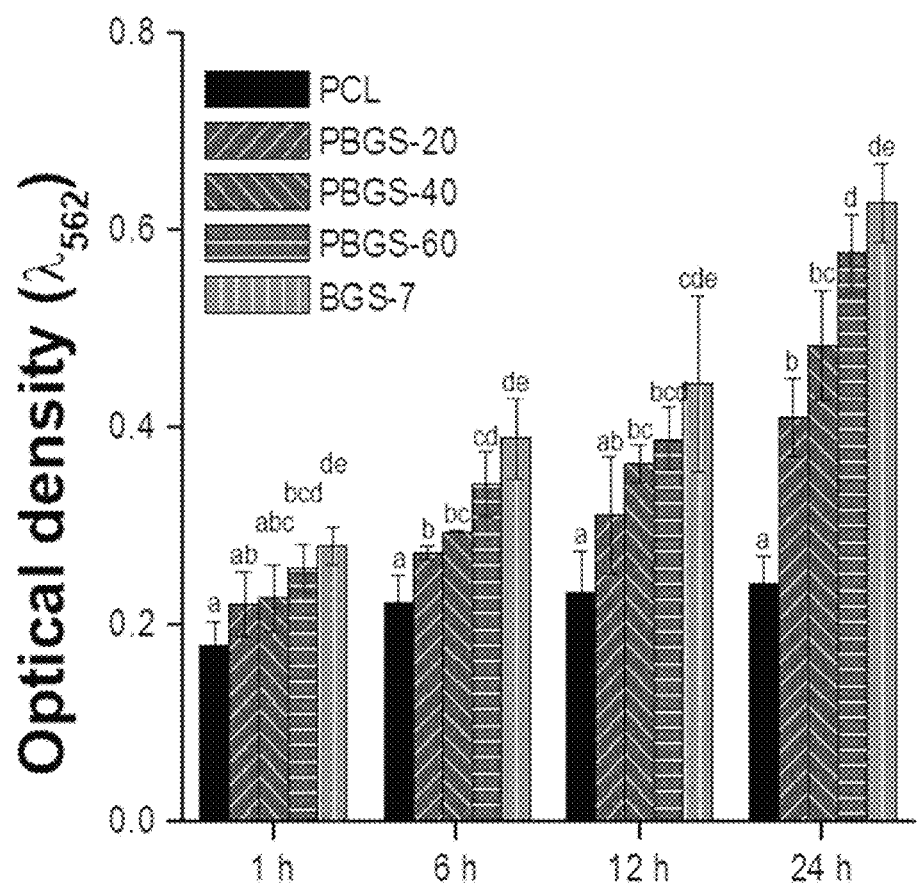

[Fig. 11A]
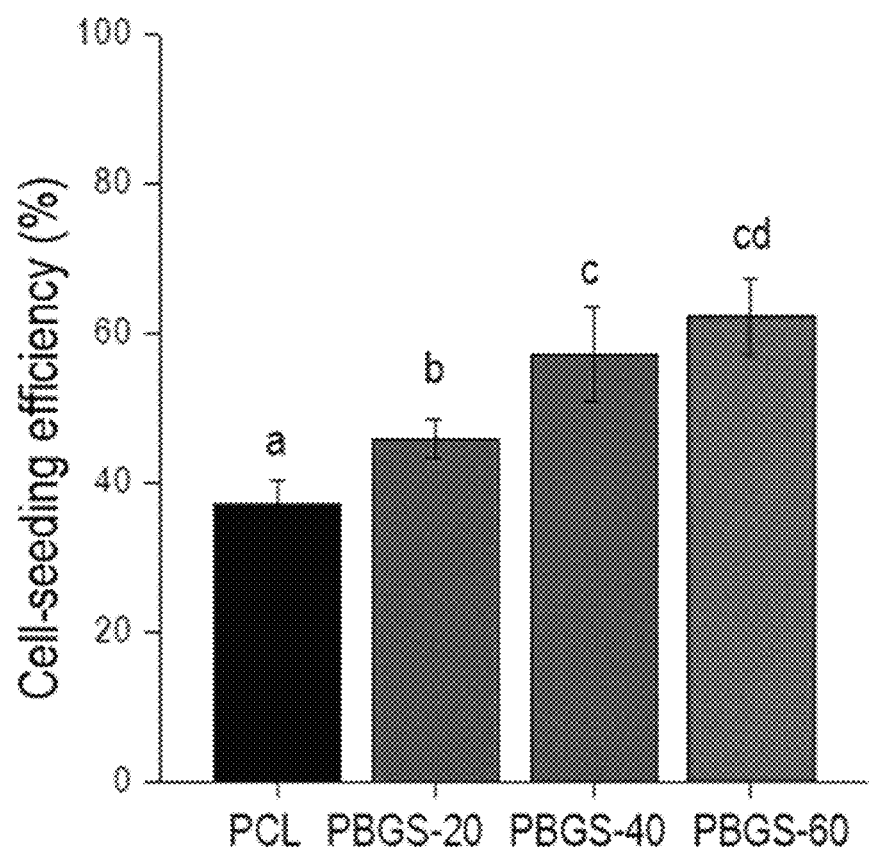

[Fig. 11B]
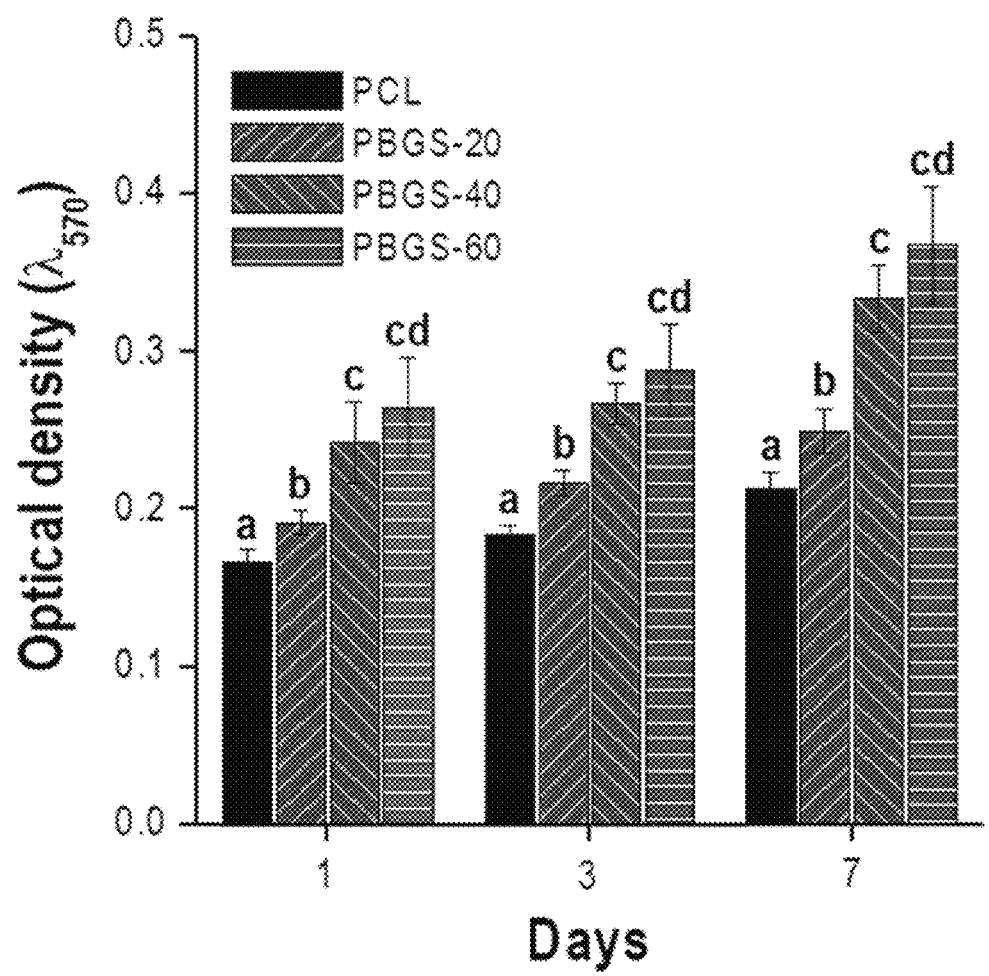

[Fig. 11C]
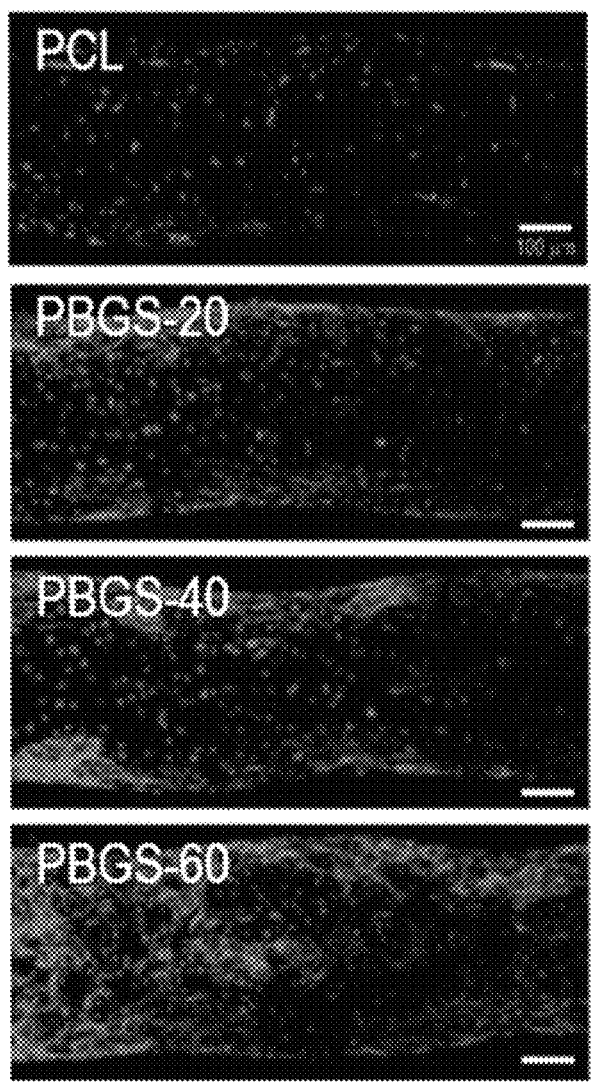

[Fig. 11D]
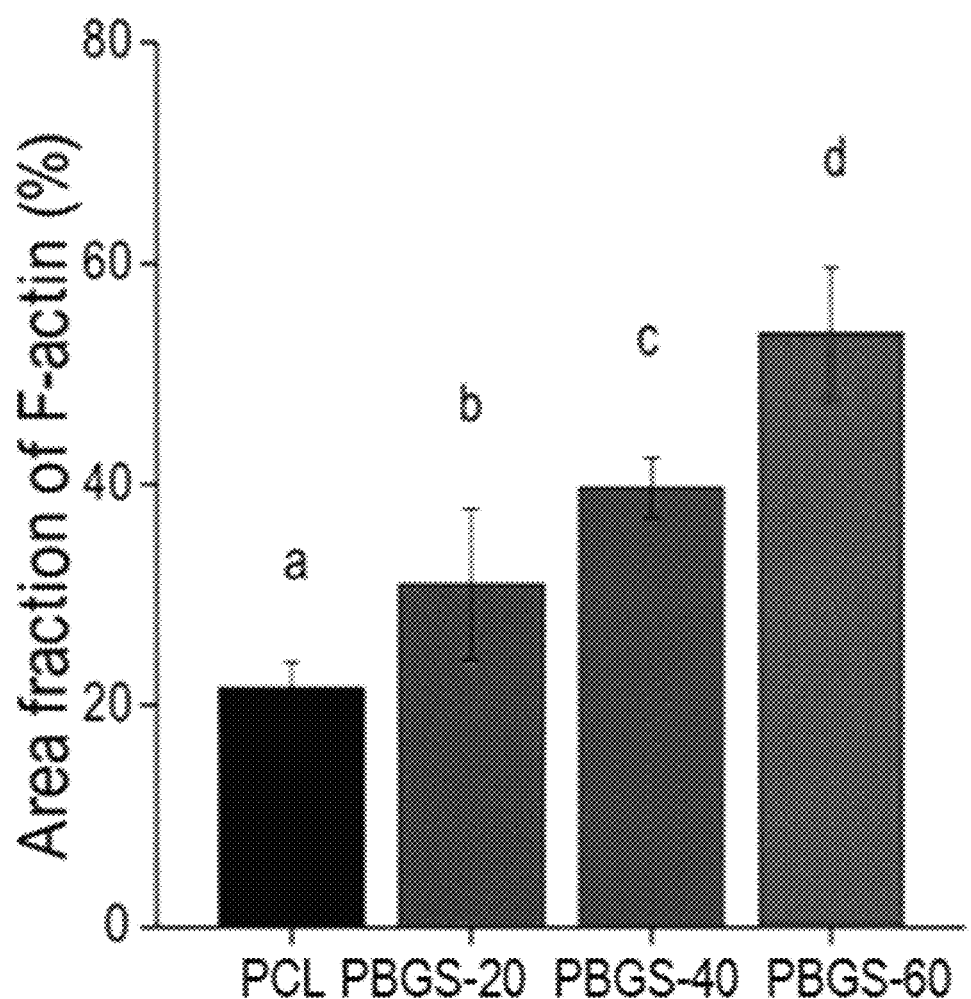

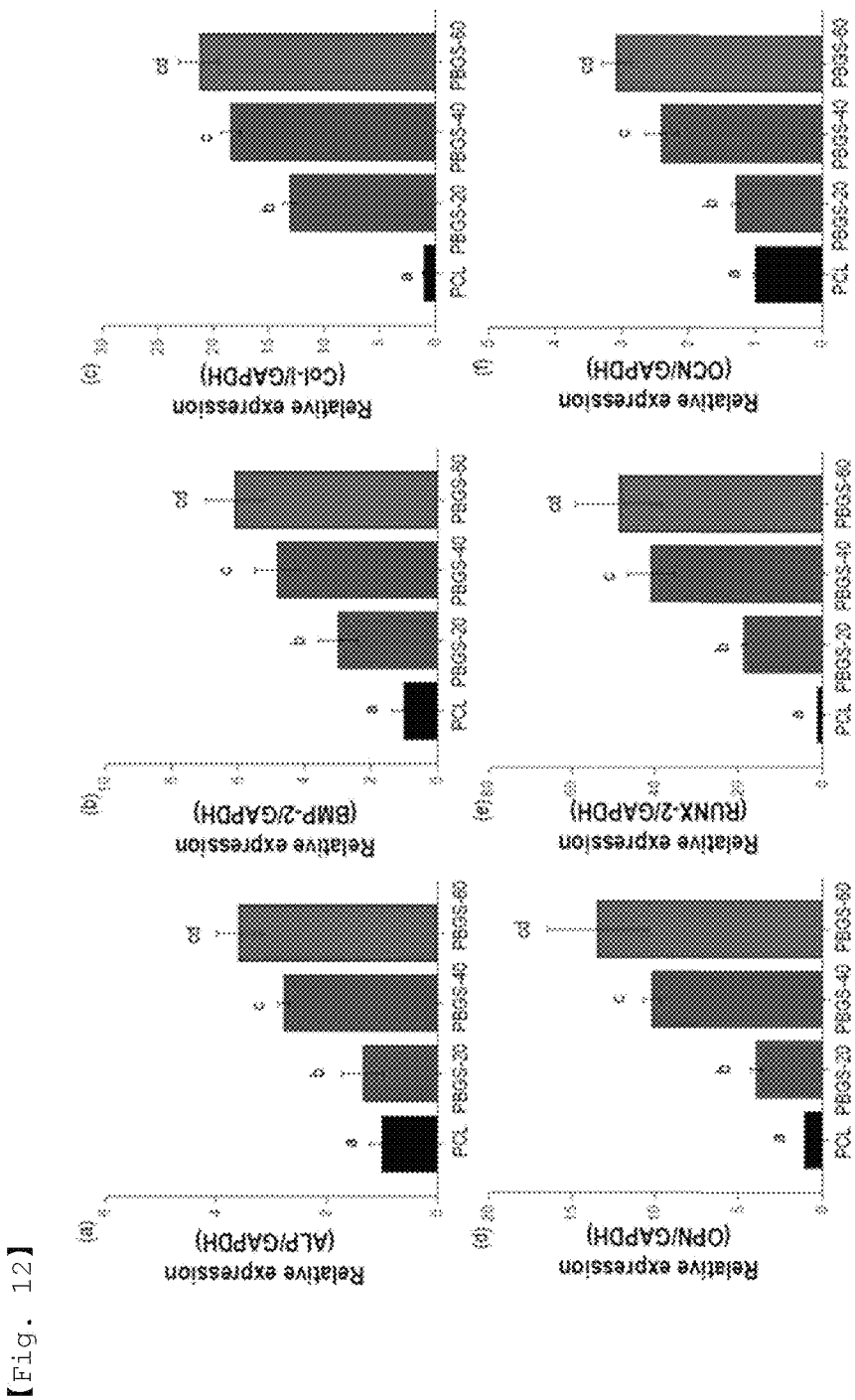
[Fig. 12]

[Fig. 13]
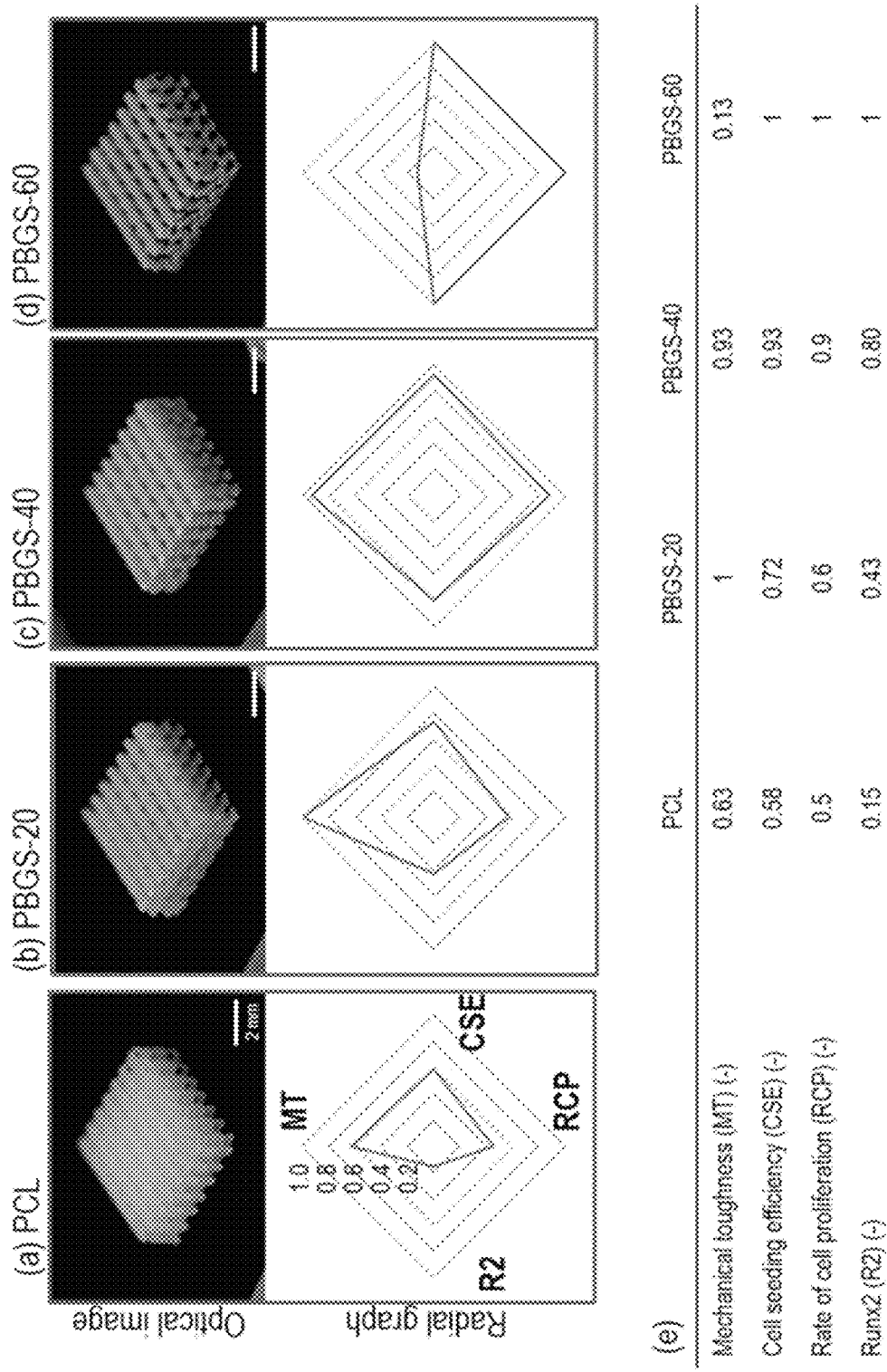

SEQUENCE LISTING

```
<160> NUMBER OF SEQ ID NOS: 14

<210> SEQ ID NO 1
<211> LENGTH: 18
<212> TYPE: DNA
<213> ORGANISM: Artificial Sequence
<220> FEATURE:
<223> OTHER INFORMATION: Artificial Sequence(runx2 forward)

<400> SEQUENCE: 1
acatccccat ccatccat                                                 18

<210> SEQ ID NO 2
<211> LENGTH: 20
<212> TYPE: DNA
<213> ORGANISM: Artificial Sequence
<220> FEATURE:
<223> OTHER INFORMATION: Artificial Sequence(runx2 reverse)

<400> SEQUENCE: 2
ggtgctgggt tctgaatctg                                               20

<210> SEQ ID NO 3
<211> LENGTH: 18
<212> TYPE: DNA
<213> ORGANISM: Artificial Sequence
<220> FEATURE:
<223> OTHER INFORMATION: Artificial Sequence(OPN forward)

<400> SEQUENCE: 3
ggaggaaacc agccaagg                                                 18

<210> SEQ ID NO 4
<211> LENGTH: 22
<212> TYPE: DNA
<213> ORGANISM: Artificial Sequence
<220> FEATURE:
<223> OTHER INFORMATION: Artificial Sequence(OPN reverse)

<400> SEQUENCE: 4
tgccagaatc agtcactttc ac                                            22

<210> SEQ ID NO 5
<211> LENGTH: 20
<212> TYPE: DNA
<213> ORGANISM: Artificial Sequence
<220> FEATURE:
<223> OTHER INFORMATION: Artificial Sequence(OCN forward)

<400> SEQUENCE: 5
ccctcctgaa ggtctcacaa                                               20

<210> SEQ ID NO 6
<211> LENGTH: 20
<212> TYPE: DNA
```

```
<213> ORGANISM: Artificial Sequence
<220> FEATURE:
<223> OTHER INFORMATION: Artificial Sequence(OCN reverse)

<400> SEQUENCE: 6
gctgtctccc tcatgtgttg                                               20

<210> SEQ ID NO 7
<211> LENGTH: 20
<212> TYPE: DNA
<213> ORGANISM: Artificial Sequence
<220> FEATURE:
<223> OTHER INFORMATION: Artificial Sequence(Col-I forward)

<400> SEQUENCE: 7
actcagccgt ctgtgcctca                                               20

<210> SEQ ID NO 8
<211> LENGTH: 20
<212> TYPE: DNA
<213> ORGANISM: Artificial Sequence
<220> FEATURE:
<223> OTHER INFORMATION: Artificial Sequence(Col-I reverse)

<400> SEQUENCE: 8
ggaggcctcg gtggacatta                                               20

<210> SEQ ID NO 9
<211> LENGTH: 19
<212> TYPE: DNA
<213> ORGANISM: Artificial Sequence
<220> FEATURE:
<223> OTHER INFORMATION: Artificial Sequence(ALP forward)

<400> SEQUENCE: 9
gcccagtgcc ttctgattt                                                19

<210> SEQ ID NO 10
<211> LENGTH: 20
<212> TYPE: DNA
<213> ORGANISM: Artificial Sequence
<220> FEATURE:
<223> OTHER INFORMATION: Artificial Sequence(ALP reverse)

<400> SEQUENCE: 10
gggcagcgtc agatgttaat                                               20

<210> SEQ ID NO 11
<211> LENGTH: 20
<212> TYPE: DNA
<213> ORGANISM: Artificial Sequence
<220> FEATURE:
<223> OTHER INFORMATION: Artificial Sequence(BMP2 forward)

<400> SEQUENCE: 11
agatctgtac cgcaggcact                                               20

<210> SEQ ID NO 12
<211> LENGTH: 19
<212> TYPE: DNA
<213> ORGANISM: Artificial Sequence
<220> FEATURE:
<223> OTHER INFORMATION: Artificial Sequence(BMP2 reverse)

<400> SEQUENCE: 12
gttcctccac ggcttcttc                                                19
```

```
<210> SEQ ID NO 13
<211> LENGTH: 22
<212> TYPE: DNA
<213> ORGANISM: Artificial Sequence
<220> FEATURE:
<223> OTHER INFORMATION: Artificial Sequence(the housekeeping gene mouse
      GAPDH forward)

<400> SEQUENCE: 13
ccttgagatc aacacgtacc ag                                              22

<210> SEQ ID NO 14
<211> LENGTH: 19
<212> TYPE: DNA
<213> ORGANISM: Artificial Sequence
<220> FEATURE:
<223> OTHER INFORMATION: Artificial Sequence(the housekeeping gene mouse
      GAPDH reverse)

<400> SEQUENCE: 14
cgcctgtaca ctccaccac                                                  19
```

COMPOSITION FOR FDM 3D PRINTER, METHOD OF MANUFACTURING THE SAME, AND MOLDED ARTICLE

CROSS REFERENCE TO RELATED APPLICATION

This application claims the benefit of priority based on Korean Patent Application No. 10-2019-0090063 filed on Jul. 25, 2019, the entire contents of which are incorporated herein by reference.

TECHNICAL BACKGROUND

The present invention relates to a composition for a FDM 3D printer, a method of manufacturing the same, and a molded article. More specifically, the present invention relates to a composition for a FDM 3D printer having excellent toughness and high biocompatibility by mixing pre-sintered bioglass and poly(ε-caprolactone), and a method of manufacturing the same, and a molded article.

BACKGROUND ART

A 3D printer refers to a facility that manufactures the actual three-dimensional shape as it is by melting materials such as polymers or metals, or laminating powders, based on three-dimensional drawings. From its first development in 1984 to the present, its scope of use has gradually expanded from product models to prototypes, and it has recently received great attention in the fields of automobile, art, education, and the like. In addition, the 3D printer market is expected to expand further in the future in that the 3D printer has the advantage of easily forming and manufacturing a product with complex structure according to the designed design.

In particular, 3D printing technology has recently made a quantum leap in the medical/biotechnological fields directly connected to human life. Examples include the 3D bioprinting field, which produces artificial organs such as the liver, kidneys, and heart using bio-inks as raw materials, the tissue engineering field, which aims to regenerate artificial tissues or organs, and the personalized medical field.

In general, 3D printing technology is basically based on a three-dimensional digital model. The three-dimensional digital model is generated by CAD or acquired by digital scanners. The 3D printing method is divided into a total of seven methods, which are a photopolymerization (PP) method, a material extrusion (ME) method, a binder jetting (BJ) method, a material jetting (MJ) method, a direct energy deposition (DED) method, a powder bed fusion (PBF) method, and a sheet lamination (SL) method, respectively. A fused deposition modeling (FDM), which is a commonly used representative 3D printing method, belongs to the material jetting method, which is a method of applying a high temperature heat to a solid filament and injecting it in a molten state through a nozzle, and requires a composition for a FDM 3D printer having mechanical properties that can facilitate three-dimensional processing such as precisely implementing a geometries.

Unlike other fields, however, due to the properties of the medical/biotechnological fields related to life, the composition used as a raw material of the 3D printer essentially requires not only its excellent mechanical properties but also a biocompatibility for performing a desired function such as in vivo transplantation of a 3D printer molded article. For example, in injection process of three-dimensional molding articles, it must have mechanical properties such as a certain level of viscosity, compressive strength, toughness, and the like, and at the same time, it must have no rejection in vivo and have biocompatiblity to provide an environment that is favorable for good bone conduction, bioactivity, and proliferation/differentiation of cells or bones.

As one of compositions for the 3D printer having such a biocompatibility in the medical/biotechnological fields, bioglass (BGS) has been used as a biomaterial for implants since its discovery in 1969. The bioglass provides excellent bioactivity and bone binding functions, by dissolving in normal physiological environment, subsequently releasing Ca, Si, Na, and P ions related to activation of genes controlling bone formation, and forming a calcium phosphate (CaP) layer on the surface. In particular, in the case of bioglass composed of $CaO$—$SiO_2$—$P_2O_5$—$B_2O_3$, it has the advantage that there is no toxicity, its compressive stiffness is twice as large as that of conventional hydroxyapatite, and osteoblast differentiation in human mesenchymal stem cells can be induced more. However, despite such an excellent biocompatibility, the artificial composite manufactured through bioglass has been raised a problem that frequent cracking may occur in a load supporting region due to intrinsic brittleness.

With regard to the composition for the 3D printer in the medical/biotechnological fields, Korean Patent No. 10-1912839 discloses a paste-type composition for FDM 3D printer having fluidity, flowability, and viscosity, which can precisely implement a variety of geometries without a melting process and can be manufactured into a molded article having a high strength, in order to solve the problems of long printing time and frequent injection failures due to melting.

However, while this patent has excellent mechanical properties in compressive strength, viscosity, and the like, as a composition for the 3D printer for biotransplantation, there are problems about improvement of biocompatibility and intrinsic brittleness as a biotransplant.

Therefore, in order to manufacture 3D printer molded articles in the medical/biotechnological fields, research on a composition for a FDM 3D printer having not only excellent mechanical properties but also high biocompatibility and improved instrinsic brittleness disadvantages, a method of manufacturing the same, and a molded article.

PRIOR ART DOCUMENTS

Patent Documents (Patent Document 1) Korean Patent Registration No. 10-1912839

DISCLOSURE

Technical Problem

The present inventors have conducted a study to overcome the intrinsic brittleness problem of the composition for the FDM 3D printer using a conventional bioglass in the manufacture of 3D printer molded articles in the medical/biotechnological fields.

In order to solve the above problems, the present inventors seek to provide a composition for a FDM 3D printer and a FDM 3D printer molded article, which not only overcome the intrinsic brittleness problem with excellent toughness but also have high biocompatibility. In addition, the present inventors seek to provide a method of manufacturing a composition for a FDM 3D printer, which improves the mechanical properties such as the strength of the molded article by being subjected to a sintering process prior to injection of the composition.

Technical Solution

According to a first aspect of the present invention:

The present invention provides a composition for a FDM 3D printer comprising bioglass and a biocompatible polymer resin.

In one embodiment of the present invention, the bioglass comprises one selected from the group consisting of CaO, $SiO_2$, $P_2O_5$, $B_2O_3$, and a combination thereof.

In one embodiment of the present invention, the bioglass is crystallized through sintering.

In one embodiment of the present invention, the biocompatible polymer resin comprises one selected from the group consisting of poly(ε-caprolactone) (PCL), polyethylene (PE), poly(methyl methacrylate) (PMMA), poly lactic acid (PLA), poly-L-lactic acid (PLLA), polyglycolide (PGA), poly lactic-co-glycolic acid (PLGA), polyvinyl chloride (PVC), polytetrafluoroethylene (PTFE), polyethylene terephthalate (PET), polyurethane, polyacetal, polyamide, polyamide elastomer, polyester, polyester elastomer, polypropylene, polyacrylonitrile, polysulfone, polyorthoester, polyanhydride, chitosan, gelatin, collagen, and a combination thereof.

In one embodiment of the present invention, the composition for the FDM 3D printer comprises 10 to 70% by weight of bioglass and 30 to 90% by weight of biocompatible polymer resin, based on the total weight of the composition.

In one embodiment of the present invention, the composition for the FDM 3D printer comprises 30 to 50% by weight of bioglass and 50 to 70% by weight of biocompatible polymer resin, based on the total weight of the composition.

According to a second aspect of the present invention:

The present invention provides a FDM 3D printer molded article having a laminated strut structure, in which the composition for the FDM 3D printer is injected into four layers.

In one embodiment of the present invention, the laminated strut structure is a laminated structure, in which the composition is cross-injected in the injection direction of a second layer of 30 to 60°, in the injection direction of a third layer of 75 to 105°, and in the injection direction of a fourth layer of 120 to 150°, based on the injection direction of a first layer.

In one embodiment of the present invention, the FDM 3D printer molded article has the toughness of 50 to 850 $kPa/mm^3$.

In one embodiment of the present invention, the FDM 3D printer molded article has the toughness of 650 to 850 $kPa/mm^3$.

According to a third aspect of the present invention:

A method of manufacturing a composition for a FDM 3D printer is provided, wherein the method comprises the steps of: (1) sintering bioglass; (2) mixing the sintered bioglass and a biocompatible polymer resin to prepare a composition; (3) putting the composition into a freezer mill to comminute the composition; and (4) melting the comminuted composition.

In one embodiment of the present invention, the bioglass in step (1) comprises one selected from the group consisting of CaO, $SiO_2$, $P_2O_5$, $B_2O_3$, and a combination thereof.

In one embodiment of the present invention, step (1) comprises a heating step and a cooling step.

In one embodiment of the present invention, the heating step is the step of heating the bioglass at a temperature increase rate of 0.01 to 0.8° C./min.

In one embodiment of the present invention, the cooling step is the step of cooling the heated bioglass at a cooling rate of 0.01 to 0.8° C./min.

In one embodiment of the present invention, the method further comprises the step of putting the sintered bioglass into a ball mill to comminute the sintered bioglass, after step (1).

In one embodiment of the present invention, the biocompatible polymer resin in step (2) comprises one selected from the group consisting of poly(ε-caprolactone) (PCL), polyethylene (PE), poly(methyl methacrylate) (PMMA), poly lactic acid (PLA), poly-L-lactic acid (PLLA), polyglycolide (PGA), poly lactic-co-glycolic acid (PLGA), polyvinyl chloride (PVC), polytetrafluoroethylene (PTFE), polyethylene terephthalate (PET), polyurethane, polyacetal, polyamide, polyamide elastomer, polyester, polyester elastomer, polypropylene, polyacrylonitrile, polysulfone, polyorthoester, polyanhydride, chitosan, gelatin, collagen, and a combination thereof.

In one embodiment of the present invention, the biocompatible polymer resin in step (2) serves as a binder.

In one embodiment of the present invention, step (2) comprises mixing 10 to 70% by weight of bioglass and 30 to 90% by weight of biocompatible polymer resin, based on the total weight of the composition for the FDM printer.

In one embodiment of the present invention, step (2) comprises mixing 30 to 50% by weight of bioglass and 50 to 70% by weight of biocompatible polymer resin, based on the total weight of the composition for the FDM printer.

Advantageous Effects

The method of manufacturing the composition for the FDM 3D printer according to the present invention overcomes the intrinsic brittleness problem of 3D printer molded articles manufactured from a conventional bioglass composition in the biotechnological/medical fields to have the effect of manufacturing a composition for a FDM 3D printer and a molded article, which exhibit excellent toughness without fracture or crack generation even in impact.

In addition, the method of manufacturing the composition for the FDM 3D printer according to the present invention has the effect of manufacturing a composition for a FDM 3D printer and a molded article, which exhibit high biocompatibility, such as activation of cell proliferation and bone formation through high hydrophilicity, protein absorption ability, calcium phosphate precipitation, and the like.

BRIEF DESCRIPTION OF DRAWINGS

FIG. 1A is a graph showing the measured experimental results of strut size according to the nozzle speed, upon manufacturing FDM 3D printer molded articles according to the Examples of the present invention and the Comparatives Examples.

FIG. 1B is a graph showing the measured experimental results of strut size according to the pneumatic pressure, upon manufacturing FDM 3D printer molded articles according to the Examples of the present invention and the Comparatives Examples.

FIG. 1C is a graph showing the measured experimental results of strut size according to the temperature, upon manufacturing FDM 3D printer molded articles according to the Examples of the present invention and the Comparatives Examples.

FIG. 1D is a graph showing the measured results of the viscosity for compositions for a FDM 3D printer according to the Examples of the present invention and the Comparatives Examples.

FIG. 2 shows processes of manufacturing and injecting the composition by mixing the bioglass and poly(ε-caprolactone) of the present invention.

FIG. 3 shows enlarged photographs observed using an optical microscope and a scanning electron microscope, energy-dispersive spectroscopy (EDS) spectra, and mapping of Ca and Si, of FDM 3D printer molded articles according to the Examples of the present invention and the Comparatives Examples.

FIG. 4 is a graph showing compressive test results of FDM 3D printer molded articles according to the Examples of the present invention and the Comparatives Examples.

FIG. 5 is a graph showing three-point bending test results of FDM 3D printer molded articles according to the Examples of the present invention and the Comparatives Examples.

FIG. 6 is a graph showing thermogravimetric analysis results of FDM 3D printer molded articles according to the Examples of the present invention and the Comparatives Examples.

FIG. 7 is a graph showing X-ray diffraction test results of FDM 3D printer molded articles according to the Examples of the present invention and the Comparatives Examples.

FIG. 8A shows 3D surface topographical images of FDM 3D printer molded articles according to the Examples of the present invention and the Comparatives Examples.

FIG. 8B is a graph showing surface roughness values of FDM 3D printer molded articles according to the Examples of the present invention and the Comparatives Examples.

FIG. 9 shows images of water contact angles measured over time of FDM 3D printer molded articles according to the Examples of the present invention and the Comparatives Examples.

FIG. 10 is a graph showing protein absorption ability measured over time of FDM 3D printer molded articles according to the Examples of the present invention and the Comparatives Examples.

FIG. 11A is a graph showing cell seeding efficiencies of FDM 3D printer molded articles according to the Examples of the present invention and the Comparatives Examples.

FIG. 11B is a graph showing MTT analysis results of FDM 3D printer molded articles according to the Examples of the present invention and the Comparatives Examples.

FIG. 11C is fluorescence images showing a cell nucleus and F-actin after culturing cells for 3 days in FDM 3D printer molded articles according to the Examples of the present invention and the Comparatives Examples.

FIG. 11D is a graph showing the area fraction of F-actin in FDM 3D printer molded articles according to the Examples of the present invention and the Comparatives Examples.

FIG. 12 is a graph showing relative expression levels of genes ALP, BMP-2, Col-I, OPN, Runx2, and OCN in FDM 3D printer molded articles according to the Examples of the present invention and the Comparatives Examples.

FIG. 13 shows optical images, and schematized diagrams after evaluating mechanical toughness, cell seeding efficiency, rate of cell proliferation, and consumption-related transcription factors for FDM 3D printer molded articles according to the Examples of the present invention and the Comparatives Examples.

BEST MODE

The embodiments provided according to the present invention can be all achieved by the following description. It must be understood that the following description describes preferred embodiments of the present invention and the present invention is not necessarily limited thereto.

Composition for FDM 3D Printer

The present invention provides a composition for a FDM 3D printer comprising bioglass and a biocompatible polymer resin.

A fused deposition modeling (FDM) 3D printer includes currently commercially available FDM 3D printer and fused filament fabrication (FFF) 3D printer, and refers to a 3D printer that manufactures a three-dimensional molded article by injecting and laminating a raw material having fluidity and flowability through a melting process.

The composition for the FDM 3D printer according to the present invention is in the form of a paste having fluidity, flowability, and viscosity. That is, the composition for the FDM 3D printer according to the present invention may be applied to the commercially available FDM and FFF 3D printers, since any 3D printing equipment capable of injection may be applied regardless of its name.

The bioglass may comprise one selected from the group consisting of CaO, $SiO_2$, $P_2O_5$, $B_2O_3$, and a combination thereof.

The bioglass according to the present invention comprises one selected from the group consisting of CaO, $SiO_2$, $P_2O_5$, $B_2O_3$, and a combination thereof, and thus has a nontoxic effect and an effect of inducing osteoblast differentiation in human mesenchymal stem cells better than hydroxyapatite, which is a basic mineral ingredient of bone. In addition, it has a compressive stiffness twice as large as hydroxyapatite, and thus can be used as a biocompatible material in the intervertebral space.

The CaO is a material that is easy to fuse with other ceramic ingredients and contributes to the fluidity, durability, and water resistance of the entire composition, and the CaO is included in an amount of preferably 20 to 60% by weight, more preferably 40 to 50% by weight, based on the total weight of the bioglass, but is not limited thereto. When the CaO content is less than 20% by weight based on the total weight of the bioglass, the effect of lowering the durability and water resistance of the 3D printer molded article may be exhibited, and when the CaO content is more than 60% by weight based on the total weight of the bioglass, there are problems that the brittleness of the 3D printer molded article is increased, or the fluidity of the entire composition is lowered to unevenly discharge the composition upon 3D printing.

The $SiO_2$ is a material that has transparency, viscosity, durability, and low fusion temperature, and contributes to stabilization of the entire composition, and the $SiO_2$ is included in an amount of preferably 15 to 40% by weight, more preferably 30 to 40% by weight, based on the total weight of the bioglass, but is not limited thereto. When the $SiO_2$ is used in an amount within the above range, the bioactivity may be improved and excellent glass crystallization may be achieved.

The $P_2O_5$ may inhibit the propagation of bacteria such as *Streptococcus mutans* to increase the bioactivity. In particular, it is an ingredient which is contained in a large amount in natural teeth or bones, and may form a glass matrix and improve permeability. The $P_2O_5$ content is preferably 6 to 20% by weight, more preferably 12 to 16% by weight, based on the total weight of the bioglass, but is not limited thereto. When the $P_2O_5$ content is less than 6% by weight based on the total weight of the bioglass, the effect of inhibiting bacterial propagation and the effect of forming a glass matrix may be weakened, and when the $P_2O_5$ content is more than 20% by weight, the brittleness may become high to cause a problem.

The $B_2O_3$ may improve glass crystallization to further increase mechanical strength and thermal expansion rate. The $B_2O_3$ content is preferably 1% by weight or less, more preferably 0.5% by weight or less, based on the total weight of the bioglass, but is not limited thereto.

The bioglass may be crystallized through sintering.

The crystallization of the bioglass proceeds through sintering and may enhance the inherent strength and hardness of the 3D printer molded article to be manufactured later. The sintering temperature may be variously changed in consideration of the inherent glass transition temperature of the bioglass. For example, the heating step in the sintering step may comprise gradually increasing the temperature at a temperature increase rate of 0.01 to 0.8° C./min to reach a peak temperature of 800 to 1200° C., and then performing sintering at the peak temperature for 160 to 200 minutes. The drastic temperature change may make it difficult to maintain the form of the bioglass injected through the 3D printer to cause cracks and pores, thereby significantly lowering the strength. In addition, when the temperature of the molded article is cooled from the peak temperature to 10 to 35° C. in the cooling step of the sintering step, it is preferable to gradually cool the temperature at a cooling rate of 0.01 to 0.8° C./min. When the temperature is cooled at a cooling rate of more than 0.8° C./min, cracks or pores occur to significantly lower the strength. The peak temperature in the sintering step affects the strength of the final molded article, and it is preferable to perform sintering at 800 to 1200° C. for use as a biological hard tissue replacement. When the peak temperature is less than 800° C., the compressive strength decreases to make it impossible to be used as a hard tissue replacement. When the peak temperature is more than 1200° C., cracks may occur.

Unlike the case where a molded article is manufactured from the bioglass crystallized through pre-sintering and a biocompatible polymer resin, if the sintering process is carried out in the final step after the manufacture of a molded article from a non-pre-sintered bioglass and a biocompatible polymer resin, the sintered molded article itself may not exist. Alternatively, only powder shapes or pure bioglass (BGS) scaffolds having a large porosity remains, and thus it is difficult to manufacture a composite scaffold having improved strength and hardness.

This can be seen through the thermogravimetric analysis (TGA) results in FIG. 6. It can be confirmed that at a temperature of 450° C. or more, all of the poly(ε-caprolactone) (PCL), which is a biocompatible polymer resin, are burned out, and thus thermal weight is analyzed only as much as the weight of bioglass. In view of this, it can be confirmed that when the sintering process is performed in the final step after manufacturing the molded article without pre-sintering, all of the poly(ε-caprolactone), which is a biocompatible polymer resin in the composite scaffold, are burned out through sintering proceeding at around 1000° C., and thus there may be no composite scaffold, or only powder shapes or bioglass scaffolds may remain.

The biocompatible polymer resin may comprise one selected from the group consisting of poly(ε-caprolactone) (PCL), polyethylene (PE), poly(methyl methacrylate) (PMMA), poly lactic acid (PLA), poly-L-lactic acid (PLLA), polyglycolide (PGA), poly lactic-co-glycolic acid (PLGA), polyvinyl chloride (PVC), polytetrafluoroethylene (PTFE), polyethylene terephthalate (PET), polyurethane, polyacetal, polyamide, polyamide elastomer, polyester, polyester elastomer, polypropylene, polyacrylonitrile, polysulfone, polyorthoester, polyanhydride, chitosan, gelatin, collagen, and a combination thereof, and may preferably be poly(ε-caprolactone), but is not limited thereto.

The composition for the FDM 3D printer may comprise 10 to 70% by weight of bioglass and 30 to 90% by weight of biocompatible polymer resin, preferably 30 to 50% by weight of bioglass and 50 to 70% by weight of biocompatible polymer resin, more preferably 35 to 45% by weight of bioglass and 55 to 65% by weight of biocompatible polymer resin, based on the total weight of the composition.

When the bioglass content is less than 10% by weight, the inherent mechanical properties of the bioglass such as compressive strength may be weakened. In addition, when the bioglass content is more than 70% by weight, it is difficult to inject the composition due to the high viscosity. On the other hand, when the biocompatible polymer resin content is less than 30% by weight, the mixing and bonding between the biocompatible polymer resin and the bioglass may not be well performed, or the effect of improving the intrinsic brittleness of the bioglass may be weakened. In addition, when the biocompatible polymer resin content is more than 90% by weight, the mechanical properties or stiffness of the injected composite scaffold may be weakened.

FDM 3D Printer Molded Article

In the present invention, a FDM 3D printer molded article, i.e., a composite scaffold of "bioglass and a biocompatible polymer resin," in which the pore geometry can be controlled to the minimum, that is, the pore size, torsional degree, shape, and porosity can be easily manipulated using a 3D printing technology, was prepared.

Before proceeding with the experiments on the mechanical properties and biocompatibility of the composite scaffold, which is the FDM 3D printer molded article, interprocess parameters such as nozzle speed, pneumatic pressure, and heating temperature (processing temperature) of the 3D printer can be optimized to manufacture each composite scaffold to a similar geometric size.

As the nozzle speed (mm/s) increases, the strut size (μm) of each composite scaffold may decrease. For example, as shown in FIG. 1A, which is tested under the conditions of a temperature of 120° C. and a pneumatic pressure of 400 kPa, the strut size may decrease as the nozzle speed increases. In addition, in order to manufacture the same strut size, the nozzle speed may decrease as the bioglass content increases.

As the pneumatic pressure (kPa) increases, the strut size (μm) of each composite scaffold may increase. For example, as shown in FIG. 1B, which is tested at a temperature of 120° C. and a nozzle speed of 5 mm/s, the strut size may increase due to the large flow rate and low viscosity of the composite as the pneumatic pressure increases. In addition, in order to manufacture the same strut size, the pneumatic pressure may increase as the bioglass content increases.

As the temperature (° C.) increases, the strut size (μm) of each composite scaffold may increase. For example, as shown in FIG. 1C, which is tested under the conditions of a nozzle speed of 5 mm/s and a pneumatic pressure of 400 kPa, the strut size may increase due to the large flow rate and low viscosity of the composite as the temperature increases. In addition, in order to manufacture the same strut size, the temperature may increase as the bioglass content increases.

In addition, due to the high stiffness of the bioglass, as the content of the bioglass in the composite scaffold increases as shown in FIG. 1D, the viscosity ($\eta^*$; complex viscosity) of the composition for the FDM 3D printer may increase. On the other hand, due to the non-viscoelastic ceramic ingredient of the bioglass, as the content the bioglass in the composite scaffold increases, the strut size may decrease linearly. Viscosity was measured using a rotatable viscometer (Bohlin Gemini HR Nano; Malvern Instruments, Surrey, UK) installed in a parallel plate shape with a diameter of 20 mm and a gap of 2 mm, and a frequency sweep was carried out at 1% strain and 140° C.

The present invention provides a FDM 3D printer molded article having a laminated strut structure, in which the composition for the FDM 3D printer is injected into four layers.

The laminated strut structure may be a laminated structure, in which the composition is cross-injected in the injection direction of a second layer of 30 to 60°, in the injection direction of a third layer of 75 to 105°, and in the injection direction of a fourth layer of 120 to 150°, based on the injection direction of a first layer.

Through the special laminated geometry in a layer-by-layer method, it is possible to manufacture 3D printer molded articles having complex shapes and fine sizes. The injection may be carried out in a nozzle mounted on a three-dimensional transport device which is position-controlled in three directions of XYZ. The three-dimensional transport device is free to move along the path calculated from the three-dimensional program, and process variables such as printing speed and nozzle position may be controlled in real time by the three-dimensional program. The composition for the FDM 3D printer is laminated one by one on the work table while creating a two-dimensional planar shape by injection, and a product, i.e., a molded article, having a three-dimensional shape can be manufactured.

The 3D printer molded article having the laminated geometry in the layer-by-layer method can increase the mechanical strength and the cell seeding efficiency by preventing the cells from falling through the pores, and can increase the completeness of the 3D printer molded article by reducing the pores. In addition, complex interconnected pore structures can increase torsional degree to facilitate bone growth, angiogenesis, feeding, and removal of waste.

The FDM 3D printer molded article may be a laminated structure, in which the composition for the FDM 3D printer is cross-injected in the injection directions of a second, a third, and fourth layers of 30 to 60°, 75 to 105°, and 120 to 150°, preferably 40 to 50°, 85 to 95°, and 130 to 140°, respectively, based on the injection direction of a first layer.

When the injection directions of the second, third, and fourth layers based on the injection direction of the first layer of the composition for the FDM 3D printer are out of the above ranges, the pore size may not be uniform. As a result, since the cells may fall through the pores in a certain region, it is difficult to obtain the effect of increasing the mechanical strength and cell seeding efficiency through the laminated geometry.

The FDM 3D printer molded article may have the toughness of 50 to 850 kPa/mm$^3$, preferably 650 to 850 kPa/mm$^3$, more preferably 700 to 720 kPa/mm$^3$.

Toughness refers to a tough property of a material that is hard to be destroyed by an external force and can withstand a strong impact well. It can be defined as a property that is not simply broken even if the amount of work required for the material to break is large and exceeds the elastic limit.

Method of Manufacturing Composition for FDM 3D Printer

The present invention relates to a method of manufacturing a composition for a FDM 3D printer, wherein the method comprises the steps of: (1) sintering bioglass; (2) mixing the sintered bioglass and a biocompatible polymer resin to prepare a composition; (3) putting the composition into a freezer mill to comminute the composition; and (4) melting the comminuted composition.

The bioglass in step (1) may comprise one selected from the group consisting of CaO, $SiO_2$, $P_2O_5$, $B_2O_3$, and a combination thereof.

The CaO is a material that is easy to fuse with other ceramic ingredients and contributes to the fluidity, durability, and water resistance of the entire composition, and the CaO is included in an amount of preferably 20 to 60% by weight, more preferably 40 to 50% by weight, based on the total weight of the bioglass, but is not limited thereto. When the CaO content is less than 20% by weight based on the total weight of the bioglass, the effect of lowering the durability and water resistance of the 3D printer molded article may be exhibited, and when the CaO content is more than 60% by weight based on the total weight of the bioglass, there are problems that the brittleness of the 3D printer molded article is increased, or the fluidity of the entire composition is lowered to unevenly discharge the composition upon 3D printing.

The $SiO_2$ is a material that has transparency, viscosity, durability, and low fusion temperature, and contributes to stabilization of the entire composition, and the $SiO_2$ is included in an amount of preferably 15 to 40% by weight, more preferably 30 to 40% by weight, based on the total weight of the bioglass, but is not limited thereto. When the $SiO_2$ is used in an amount within the above range, the bioactivity may be improved and excellent glass crystallization may be achieved.

The $P_2O_5$ may inhibit the propagation of bacteria such as *Streptococcus mutans* to increase the bioactivity. In particular, it is an ingredient which is contained in a large amount in natural teeth or bones, and may form a glass matrix and improve permeability. The $P_2O_5$ content is preferably 6 to 20% by weight, more preferably 12 to 16% by weight, based on the total weight of the bioglass, but is not limited thereto. When the $P_2O_5$ content is less than 6% by weight based on the total weight of the bioglass, the effect of inhibiting bacterial propagation and the effect of forming a glass matrix may be weakened, and when the $P_2O_5$ content is more than 20% by weight, the brittleness may become high to cause a problem.

The $B_2O_3$ may improve glass crystallization to further increase mechanical strength and thermal expansion rate. The $B_2O_3$ content is preferably 1% by weight or less, more preferably 0.5% by weight or less, based on the total weight of the bioglass, but is not limited thereto.

Step (1) may comprise a heating step and a cooling step. In addition, the heating step may be a step of heating the bioglass at a temperature increase rate of 0.01 to 0.8° C./min, and the cooling step is the step of cooling the heated bioglass at a cooling rate of 0.01 to 0.8° C./min.

The crystallization of the bioglass proceeds through the step of sintering the bioglass, which is step (1), and can enhance the inherent strength and hardness of the 3D printer molded article to be manufactured later. The sintering temperature may be variously changed in consideration of the inherent glass transition temperature of the bioglass. For example, the heating step in the sintering step may comprise gradually increasing the temperature at a temperature increase rate of 0.01 to 0.8° C./min to reach a peak temperature of 800 to 1200° C., and then performing sintering at the peak temperature for 160 to 200 minutes. The drastic temperature change may make it difficult to maintain the form of the bioglass injected through the 3D printer to cause cracks and pores, thereby significantly lowering the strength. In addition, when the temperature of the molded article is cooled from the peak temperature to 10 to 35° C. in the cooling step of the sintering step, it is preferable to gradually cool the temperature at a cooling rate of 0.01 to 0.8° C./min. When the temperature is cooled at a cooling rate of more than 0.8° C./min, cracks or pores occur to significantly lower the strength. The peak temperature in the sintering step affects the strength of the final molded article, and it is preferable to perform sintering at 800 to 1200° C. for use as a biological hard tissue replacement. When the peak temperature is less than 800° C., the compressive strength decreases to make it impossible to be used as a hard tissue replacement. When the peak temperature is more than 1200° C., cracks may occur.

The method may further comprise the step of putting the sintered bioglass into a ball mill to comminute the sintered bioglass. Prior to mixing with the biocompatible polymer resin, the sintered bioglass may be comminuted through a ball mill to make the particle size uniform. However, the comminuting method is not limited to the ball mill as long as it is a method of uniformizing the particle size, and a milling method other than the ball mill or other comminuting methods may be used.

The biocompatible polymer resin in step (2) may comprise one selected from the group consisting of poly(ε-caprolactone) (PCL), polyethylene (PE), poly(methyl methacrylate) (PMMA), poly lactic acid (PLA), poly-L-lactic acid (PLLA), polyglycolide (PGA), poly lactic-co-glycolic acid (PLGA), polyvinyl chloride (PVC), polytetrafluoroethylene (PTFE), polyethylene terephthalate (PET), polyurethane, polyacetal, polyamide, polyamide elastomer, polyester, polyester elastomer, polypropylene, polyacrylonitrile, polysulfone, polyorthoester, polyanhydride, chitosan, gelatin, collagen, and a combination thereof, and may preferably be poly(ε-caprolactone), but is not limited thereto.

The biocompatible polymer resin may serve as a binder. The binder binds the fine bioglasses to each other to have cohesion and viscosity, while the bioglasses have excellent toughness, and thus the intrinsic brittleness problem can be overcome. In addition, when melting the composition mixed with the biocompatible polymer resin serving as a binder with the bioglass, the composition may be provided with fluidity and flowability to facilitate injection.

The composition in step (2) may comprise 10 to 70% by weight of bioglass and 30 to 90% by weight of biocompatible polymer resin, preferably 30 to 50% by weight of bioglass and 50 to 70% by weight of biocompatible polymer resin, more preferably 35 to 45% by weight of bioglass and 55 to 65% by weight of biocompatible polymer resin, based on the total weight of the composition.

When the bioglass content is less than 10% by weight, the inherent mechanical properties of the bioglass such as compressive strength may be weakened. In addition, when the bioglass content is more than 70% by weight, it is difficult to inject the composition due to the high viscosity. On the other hand, when the biocompatible polymer resin content is less than 30% by weight, the mixing and bonding between the biocompatible polymer resin and the bioglass may not be well performed, or the effect of improving the intrinsic brittleness of the bioglass may be weakened. In addition, when the biocompatible polymer resin content is more than 90% by weight, the mechanical properties or stiffness of the injected composite scaffold may be weakened.

Step (3) may be the step of putting the composition into a freezer mill to comminute the composition. The composition was comminuted to have an average particle size of 1.5 to 2.5 μm through the freezer mill. The average particle size is calculated from the values (50% accumulated points in the average diameter distribution of the particles) measured by the particle size analyzer (APA2000; MALVERN).

Step (4) may use a heating device connected to the 3D printer.

The heating device connected to the 3D printer operates in a temperature range of 25 to 250° C. and can melt the comminuted composition. As the bioglass and the biocompatible polymer resin, each of which were in a solid state, are melted and transformed into a paste, the composition may be provided with fluidity and flowability to facilitate injection.

Hereinafter, preferred examples will be provided to help to understand the present invention, but the following examples are provided not to limit the present invention but to facilitate the understanding of the present invention.

MODE FOR CARRYING OUT THE INVENTION

All experimental data in the present specification are expressed as mean±standard deviation (SD), and each experiment was carried out at least three times. In addition, student's t-test or one-way analysis of variance test was carried out using SPSS software (ver. 20.0; SPSS, Inc., Chicago, IL).

In FIGS. 8B, 10, 11A, 11B, 11D, and 12 according to the present invention, different alphabet letters and letter arrays described in the graphs are for explaining statistical significance. Specifically, in order from the left in the graphs of the drawings as mentioned above, the experimental data of the PCL, PBGS-20, PBGS-40, PBGS-60, and BGS-7 are defined as the alphabet letters a, b, c, d, and e, respectively; in the notation, it is written as the letter arranged last in the alphabet letter array to indicate the corresponding experimental data.

In addition, when an alphabet letter is written only one letter, it is defined that the difference between the corresponding experimental data and the remaining experimental data is statistically significant ($P<0.05$). On the other hand, when two or more alphabetic letters are written, it is defined that the difference between the "experimental data corresponding to the letter arranged last" and the "other experimental data corresponding to the letter arranged before" among the alphabetic letter arrays is not statistically significant. For example, a is defined as "the difference between a and the rest of b, c, d, e is statistically significant," ab is defined as "the difference between b and a is not statistically significant," abc is defined as "the difference between c and a, b is not statistically significant," cd is defined as "the difference between d and c is not statistically significant," and cde is defined as "the difference between e and c, d is not statistically significant."

EXAMPLES

Manufacture of Composition for FDM 3D Printer

TABLE 1

|  |  | Weight (g) |
|---|---|---|
| Bioglass (BGS) | CaO | 139.8 |
|  | SiO$_2$ | 113.7 |
|  | P$_2$O$_5$ | 45.6 |
|  | B$_2$O$_3$ | 0.9 |
| Total Weight (g) |  | 300 |

First, CaO, SiO$_2$, P$_2$O$_5$, and B$_2$O$_3$ in a dry powder state were placed in a container according to the contents as described in Table 1 above and mixed to prepare a total of 300 g of bioglass.

Examples 1 to 3 and Comparative Examples 1 and 2

The prepared bioglass was sintered under the conditions as shown in Table 2 below.

TABLE 2

| Sintering Process | |
|---|---|
| Temperature Range | Time (minute) |
| 0 → 600° C. | 720 |
| 600° C. (Holding) | 60 |
| 600 → 1000° C. | 800 |
| 1000° C. (Holding) | 180 |
| 1000 → 600° C. | 800 |
| 600° C. (Holding) |  |
| 600 → 20° C. | 720 |

The sintered bioglass was placed in a ball mill (High-Energy Ball Mill; FRITSCH) and comminuted to have an average particle size of 2.1 μm. The comminuted bioglass was mixed with poly(ε-caprolactone) (PURASORB PC12; CorbionPurac) in the composition ratio as shown in Table 3 below to prepare a composition having a total weight of 100 g for each of Examples 1 to 3 and Comparative Examples 1 and 2. Thereafter, the composition was put in a freezer mill (6875D; SPEX Sampleprep) as shown in FIG. 2, and comminuted to have an average particle size of 2.1 μm. The comminuted composition was melted at the melting temperature as shown in Table 3 below with a heating device connected to a 3D printer to prepare a paste-type composition for a FDM 3D printer.

TABLE 3

|  | Bioglass (BGS) (%) | Poly (ε-Caprolactone) (%) | Total (%) | Melting Temperature (° C.) |
|---|---|---|---|---|
| Example 1 (PBGS-20) | 20 | 80 | 100 | 120 |
| Example 2 (PBGS-40) | 40 | 60 | 100 | 120 |
| Example 3 (PBGS-60) | 60 | 40 | 100 | 140 |
| Comparative Example 1 (BGS) | 100 | 0 | 100 | 25 |
| Comparative Example 2 (PCL) | 0 | 100 | 100 | 100 |

Molded articles were injected using the paste-type compositions for the FDM 3D printer of Examples 1 to 3 and Comparative Examples 1 and 2 above as raw materials. Upon injecting the molded articles, a FDM 3D printer (DTR3-331S-EX; Dasa Robot System) having a nozzle diameter of 500 μm was used. The composition for the FDM 3D printer was filled in a nozzle, and the composition was injected through an injection port and laminated on the upper surface of the work surface in a 6×6×2 mm$^3$ size. The composition was injected in a layer-by-layer manner and formed a laminated strut structure in four directions as shown in FIG. 2, in which it crosses in the injection direction of a second layer of 45°, in the injection direction of a third layer of 90°, and in the injection direction of a fourth layer of 135°, based on the injection direction of a first layer.

Upon injecting the molded article of each of Examples 1 to 3 and Comparative Examples 1 and 2, the parameters such as nozzle speed, processing temperature, and pneumatic pressure are optimally controlled as shown in Table 4 below to form a composite scaffold having a strut diameter (390-425 μm), first and second pore sizes, and porosity (42-47%) within similar ranges as shown in Table 5 below. From the above, the difference in the geometries of the composite scaffolds did not cause the difference in the effect on the cell activity in the composite scaffold.

The strut diameter, first pore size, and second pore size were measured using a scanning electron microscope (SEM) (SNE-3000M; SEC Inc., South Korea). In addition, the porosity was calculated using the following equation and the value of the bulk density (ρ) (PCL (1.135 g/cm$^3$)/bioglass (3.05 g/cm$^3$)):

$$\text{Porosity}(\%) = (1 - (1/\rho_s) \times (W_s/V_a)) \times 100$$

(ρ: bulk density, $W_s$: weight of structure, $V_a$: volume of structure)

TABLE 4

|  | Processing Time (min) | Nozzle Speed (mm/s) | Pneumatic Pressure (kPa) |
|---|---|---|---|
| Example 1 (PBGS-20) | 2 | 5 | 320 |
| Example 2 (PBGS-40) | 2 | 5 | 450 |
| Example 3 (PBGS-60) | 2 | 5 | 500 |
| Comparative Example 1 (BGS) | 2.5 | 5 | 430 |
| Comparative Example 2 (PCL) | 2 | 5 | 480 |

TABLE 5

|  | Strut Diameter (μm) | First Pore Size (μm) | Second Pore Size (μm) | Porosity (%) |
|---|---|---|---|---|
| Example 1 (PBGS-20) | 424.3 ± 7.7 | 400.7 ± 10.2 | 214.3 ± 14.1 | 42.5 ± 2.1 |
| Example 2 (PBGS-40) | 401.4 ± 16.3 | 415.7 ± 14.4 | 222.9 ± 16.7 | 43.1 ± 1.0 |
| Example 3 (PBGS-60) | 420.7 ± 9.2 | 412.1 ± 7.0 | 216.4 ± 20.5 | 42.3 ± 1.2 |
| Comparative Example 1 (BGS) | 392.5 ± 20.1 | 391.5 ± 9.1 | 207.7 ± 20.7 | 46.8 ± 3.0 |
| Comparative Example 2 (PCL) | 400.7 ± 4.7 | 439.3 ± 14.3 | 221.4 ± 13.6 | 43.1 ± 1.5 |

Experimental Example 1

Observation by Optical Microscope and Scanning Electron Microscope, and EDS Test The shapes of the composite scaffolds of Examples 1 to 3 and Comparative Examples 1 and 2 above were observed using an optical microscope (BX FM-32; Olympus, Tokyo, Japan) and a scanning electron microscope (SEM) (SNE-3000M; SEC Inc., South Korea). In addition, in order to evaluate the distribution of inorganic elements in the composite scaffold, an energy-dispersive spectroscopy (EDS) test was carried out using a field emission scanning electron microscope (JSM7500F; JEOL LTD.).

Enlarged photographs observed through the optical microscope and the scanning electron microscope, EDS spectra through the EDS test, and mapping of Ca and Si are shown in FIG. 3.

As a result, the rough surface of the struts promoting cell adhesion and bone tissue differentiation was confirmed in the composite scaffold through enlarged SEM photographs. In addition, it was confirmed that through the EDS spectra and the mapping of Ca and Si, the concentration of Ca and Si in the composite scaffold increased as the bioglass composition ratio in the composite scaffold increased.

Experimental Example 2

Compressive Test

The stiffness, yield displacement, and yield stress of the molded articles manufactured through the compositions for the FDM 3D printer of Examples 1 to 3 and Comparative Examples 1 to 2 above were measured. In the measurement, a molded article which was a composite scaffold having a size of 10×10×5 mm³ was used. For these, the stiffness, yield displacement, and yield stress were measured through a compressive testing machine (MTS Bionix Tabletop Test Systems; MTS System Corp., MN, USA) having a compression rate of 0.5 mm/min.

TABLE 6

|  | Stiffness (N/mm) | Yield Displacement (mm) | Yield Stress (MPa) |
|---|---|---|---|
| Example 1 | 2.5 ± 0.1 | 0.6 ± 0.03 | 6.1 ± 0.2 |
| Example 2 | 2.9 ± 0.1 | 0.5 ± 0.04 | 6.6 ± 0.1 |
| Example 3 | 2.9 ± 0.2 | 0.5 ± 0.06 | 5.8 ± 0.6 |

TABLE 6-continued

|  | Stiffness (N/mm) | Yield Displacement (mm) | Yield Stress (MPa) |
|---|---|---|---|
| Comparative Example 1 | 25.9 ± 6.3 | 0.2 ± 0.01 | 21.2 ± 5.8 |
| Comparative Example 2 | 1.1 ± 0.1 | 0.4 ± 0.02 | 2.6 ± 0.2 |

The experimental results and measured values for the compressive test are shown in Table 6 above and FIG. 4.

It was confirmed that in Examples 1 to 3 in which bioglass (BGS) and poly(ε-caprolactone) were mixed, the stiffness was increased than that of Comparative Example 2, which was a poly(ε-caprolactone) scaffold.

Experimental Example 3

Three-Point Bending Test

The bending moment max, bending stress max, and toughness of the molded articles manufactured through the compositions for the FDM 3D printer of Examples 1 to 3 and Comparative Examples 1 to 2 above were measured. In the measurement, a molded article which was a composite scaffold having a size of 30×4×3 mm³ was used. For these, the bending test was carried out through a three-point bending test measuring machine (MTS Bionix Tabletop Test Systems; MTS System Corp., MN, USA) having a speed of 0.5 mm/min to measure the bending moment max, bending stress max, and toughness.

TABLE 7

|  | Bending Moment Max (N · mm) | Bending Stress Max (MPa) | Toughness (kPa/mm³) |
|---|---|---|---|
| Example 1 | 55.8 ± 0.5 | 6.3 ± 0.1 | 760 ± 41.7 |
| Example 2 | 47.6 ± 0.9 | 5.6 ± 0.2 | 710 ± 5.48 |
| Example 3 | 38.1 ± 0.5 | 4.3 ± 0.2 | 100 ± 22.7 |
| Comparative Example 1 | 74.7 ± 6.8 | 7.8 ± 0.7 | 5.9 ± 0.9 |
| Comparative Example 2 | 37.3 ± 1.8 | 4.6 ± 0.2 | 480 ± 46.2 |

The experimental results and measured values for the three-point bending test are shown in Table 7 above and FIG. 5.

As shown in FIG. 5, Examples 1 to 3, in which bioglass (BGS) sintered before injection and poly(ε-caprolactone) were mixed, showed improved toughness, compared with Comparative Example 1 using only bioglass (BGS). Specifically, Comparative Example 1 consisting of only bioglass showed a bending moment max of 74.7±6.7 N·mm and a bending stress of 7.8±0.7 MPa, but the weakest toughness of 5.9±0.9 KPa/mm³. On the other hand, it was confirmed that Examples 1 to 3 mixed with poly(ε-caprolactone) showed improved toughness of 129 times, 120 times, and 17 times, respectively, compared with Comparative Example 1. In particular, it was confirmed that since the composite scaffold showed significantly increased toughness only in certain cases such as Examples 1 to 2 mixed with 20% or 40% of bioglass based on the total weight of the composite scaffold, the problems of existing intrinsic brittleness were overcome.

Experimental Example 4

Thermogravimetric Analysis (TGA)

10 mg of the compositions for the FDM 3D printer of Examples 1 to 3 and Comparative Examples 1 and 2 were heated from 30° C. to 800° C. at a temperature increase rate of 20° C./min. Thermogravimetric analysis for the heated composition was carried out using a thermogravimetric analyzer (TGA-2050; TA-Instruments) under nitrogen conditions.

Thermogravimetric analysis results are shown in FIG. 6.

As a result of thermogravimetric analysis, Comparative Example 1 consisting of only bioglass had no weight change, whereas Comparative Example 2, which was a poly(ε-caprolactone) scaffold, was completely decomposed under 500° C. conditions, and no weight remained. In addition, in Examples 1 to 3, which are bioglasses mixed with poly(ε-caprolactone), thermal weight was analyzed as much as the weight of bioglass initially mixed.

Experimental Example 5

X-Ray Diffraction (XRD)

In order to measure the crystal size, an X-ray diffractometer (Siemens D500 WAXD; Siemens) using $CuK_\alpha$ radiation under beam conditions of 40 kV and 20 mA was used. The X-ray diffraction was carried out under the condition that 2θ=15-35° and step size was 0.1°.

X-ray diffraction results are shown in FIG. 7.

In Comparative Example 2, the strongest peaks were shown at 2θ=21.3° and 23.7° associated with the crystal faces(110) and (200). In addition, Comparative Example 1 showed a peak with 2θ=31.8° associated with the crystal face(211) of the hydroxyapatite structure. In the X-ray diffraction, it could be confirmed that the bioglass was well accumulated in the composite scaffold through the reflection intensity of the bioglass.

Experimental Example 6

Measurement of Surface Roughness/3D Surface Topographical Images

In order to qualitatively measure surface roughness, a surface roughness tester (Nanoview-m4151p; Korea) was used. In addition, 3D image and surface roughness value (Ra) were obtained using the roughness tester with phase-shifting interferometry, which is a general optical technique for noncontact surface profilometry.

First, it was confirmed from 3D surface topographical images as shown in FIG. 8A that Examples 1 to 3 and Comparative Example 1, which are composite scaffolds comprising bioglass, had rougher surfaces, compared with Comparative Example 2, which was a poly(ε-caprolactone) scaffold. In addition, it was confirmed that through the surface topographical image curve, the surface roughness was increased as the bioglass content was increased.

In addition, in order to quantitatively measure surface roughness, the surface roughness value (Ra) was measured using the image of FIG. 8A and the following calculation equation, and the results are shown in Table 8 below and FIG. 8B.

$$Ra = [\int |Z(x)|dx]/L$$

(Z and L in FIG. 4(c) are the height and length of the rough structure)

TABLE 8

| | Surface Roughness (Ra) (Unit: nm) |
|---|---|
| Example 1 | 144.7 ± 31.9 |
| Example 2 | 168.1 ± 26.3 |
| Example 3 | 234.3 ± 41.7 |
| Comparative Example 1 | 284.6 ± 55.4 |
| Comparative Example 2 | 118.5 ± 14.9 |

From the above, it was confirmed that as the bioglass content was increased, the surface roughness of the composite scaffold was increased.

Experimental Example 7

Measurement of Water Contact Angle

The hydrophilicity of composite scaffolds was evaluated using a water contact angle measuring device. 10 μL of water droplets were placed on the surface of the composite scaffold, and the water contact angle was measured using a sessile drop method at room temperature.

The water contact angle (WCA) of the composite scaffold is a function of time and the results are shown in FIG. 9. As a result of the measurement, it was confirmed that the water contact angle decreased as the bioglass content increased. For example, Comparative Example 2 showed the highest water contact angle of 78±3°, whereas Example 1 comprising bioglass at a composition ratio of 20% showed the reduced water contact angle of 26±3°. From the above, it was confirmed that the hydrophilicity of the composite scaffold was improved as the content of the bioglass in the composite scaffold was increased.

Experimental Example 8

Measurement of Protein Absorption Ability

In order to measure the protein absorption ability of composite scaffolds, bicinchoninic acid (BCA) protein assay (Pierce Kit; Thermo Scientific) was used. The composite scaffold was placed in 24-well plate containing α-minimal essential medium (Life Sciences, USA) comprising 10% fetal bovine serum (Gemini Bio-Products, USA) and 1% antibiotic (Antimycotic; Cellgro, USA). The composite scaffold was then incubated at 37° C. for 1, 6, 12, and 24 hours. Before measuring the absorbance, the composite scaffold was washed with a phosphate buffered saline (PBS) and dissolved in 0.1% Triton X-100. 25 μL of lysate was then added to 200 μL of BCA working reagent. Finally, the mixture was incubated at 37° C. for 30 minutes. Absorbance was measured at 562 nm using a microplate reader (EL800; Bio-Tek Instruments, Winooski, VT).

After 1, 6, 12, and 24 hours, the measured results for the protein absorption ability of Examples 1 to 3 and Comparative Examples 1 and 2 are shown in FIG. 10. In contrast to the case of Comparative Example 2 comprising only poly (ε-caprolactone), it was confirmed that in Examples 1 to 3 and Comparative Example 1 comprising bioglass, the protein absorption ability was increased over time. In addition, it was confirmed that as the composition ratio of the bioglass increases in Examples 1 to 3 and Comparative Example 1, the protein absorption ability of the composite scaffold increased due to the irreversible interaction of the electrostatic force between the amine group of the protein and the negatively charged bioglass ingredient in the composite scaffold.

Experimental Example 9

Cell Activity in In Vitro Composite Scaffold

The prepared composite scaffolds (6×6×2 mm³) were sterilized with 70% ethanol under ultraviolet rays. Mouse preosteoblast tissue (MC3T3-E1) was sprayed onto the composite scaffold at a density of 1×10⁵ cells/mL, and then the composite scaffold was placed in 24-well plate containing α-minimal essential medium (Life Sciences, USA) comprising 10% fetal bovine serum (Gemini Bio-Products, USA) and 1% antibiotic (Antimycotic; Cellgro, USA). Samples were incubated under the conditions of 5% $CO_2$ and 37° C. and the incubator was changed every day.

Viable cells were determined through cell proliferation assay (MTT Assay) (Cell Proliferation Kit I; Boehringer Mannheim). 0.5 mg/mL of MTT was added to the sample and incubated under 37° C. conditions for 4 hours. Thereafter, absorbance was measured using a microplate reader (EL800; Bio-Tek Instruments, Winooski, VT) at 570 nm.

In addition, in order to detect a cell nucleus, the composite scaffold was exposed to fluorescent staining of diamidino-2-phenylindole (DAPI; Invitrogen, Carlsbad, CA). In addition, phalloidin (Alexa Fluor 594; Invitrogen, Carlsbad, CA) staining was carried out to visualize an actin cytoskeleton, and the stained cells were observed through a confocal microscope (LSM 700; Carl Zeiss, Germany).

In addition, in order to measure the relative expression levels of type-I collagen (Col-I), runt-related transcription factor (Runx2), alkaline phosphatase (ALP), osteopontin (OPN), osteocalcin (OCN), and bone morphogenetic protein 2 (BMP2), real-time polymerase chain reaction of the MC3T3-E1 cells incubated for 7 days in the composite scaffold was carried out. Total RNA was isolated from the composite scaffold incubated using TRIzol reagent (Sigma-Aldrich), and cDNA was synthesized therefrom. ReverTra Ace qPCR RT Master Mix (Toyobo, Japan) was used in the reverse transcription reaction. In addition, cDNA was amplified by THUNDERBIRD SYBR qPCR Mix (Toyobo, Japan) using ABI Step One Plus. cDNA amplification was carried out by first repeating 40 cycles of denaturation for 1 minute at 95° C., and then for 15 seconds at 95° C., for 60 seconds at 60° C., and for 15 seconds at 72° C., and finally extending cDNA for 5 minutes at 72° C.

Gene-specific primers are runx2 (forward: 5'-ACATCCCCATCCATCCAT-3'(SEQ ID NO: 1) reverse: 5'-GGTGCTGGGTTCTGAATCTG-3' (SEQ ID NO: 2)), OPN (forward: 5'-GGAGGAAACCAGCCAAGG-3'(SEQ ID NO: 3), reverse: 5'-TGCCAGAATCAGTCACTTTCAC-3' (SEQ ID NO: 4)), OCN (forward: 5'-CCCTCCTGAAGGTCTCACAA-3' (SEQ ID NO: 5), reverse: 5'-GCTGTCTCCCTCATGTGTTG-3' (SEQ ID NO: 6)), Col-I (forward: 5'-ACTCAGCCGTCTGTGCCTCA-3' (SEQ ID NO: 7), reverse: 5'-GGAGGCCTCGGTGGACATTA-3' (SEQ ID NO: 8)), ALP (forward: 5'-GCCCAGTGCCTTCTGATTT-3' (SEQ ID NO: 9), reverse: 5'-GGGCAGCGTCAGATGTTAAT-3' (SEQ ID NO: 10)), BMP2 (forward: 5'-AGA TCT GTA CCG CAG GCACT-3' (SEQ ID NO: 11), reverse: 5'-GTTCCTCCACGGCTTCTTC-3'(SEQ ID NO: 12)), the housekeeping gene mouse GAPDH (forward: 5'-CCTTGAGATCAACACGTACCAG-3' (SEQ ID NO: 13), reverse: 5'-CGCCTGTACACTCCACCAC-3' (SEQ ID NO: 14)).

In order to confirm the cell activity of the in vitro composite scaffold, the cell seeding efficiency was first measured. After 4 hours of cell culture, the measured results of the cell seeding efficiency were shown in FIG. 11A. Comparative Example 2 comprising only poly(ε-caprolactone) showed the lowest cell seeding efficiency, whereas in Examples 1 to 3 mixed with the bioglass, the cell seeding efficiency also increased as the bioglass content increased. From the above, it could be confirmed that as the bioglass content was increased, the cell adhesion ability of the composite scaffold increased due to the surface roughness, hydrophilicity, protein absorption ability, and biochemical properties. In addition, when considered in conjunction with Experimental Example 6, it could be seen that as the bioglass content increased, the surface roughness of the composite scaffold increased to increase the protein absorption ability and to activate various cellular activities such as initial cell adhesion, growth, and differentiation.

Through MTT analysis in FIG. 11B, it was confirmed that cell proliferation also increased as the content of the bioglass in the composite scaffold increased. From the above, it could be confirmed that the cell proliferation in the composite scaffold depends on the bioglass content.

The fluorescence images in FIG. 11C show the blue stained cell nuclei and red F-actin after 3 days of cell culture. From FIG. 11D, it was also confirmed that the area of F-actin gradually increased as the weight ratio of the bioglass in the composite scaffold increased.

Relative expression level of each of genes ALP, BMP-2, Col-I, OPN, Runx2, and OCN is showed in FIG. 12. In particular, it was confirmed that the expression level of all the genes was high in Examples 2 and 3 mixed with 40% or 60% of bioglass based on the total weight of the composite scaffold. From the above, it was confirmed that when the content of the bioglass in the composite scaffold was in a certain range, the bioglass affected bone formation differentiation and biological activity to show high gene expression levels.

Experimental Example 10

Optimal Composition Ratio of Bioglass in Composite Scaffold

The top of FIG. 13 shows each optical image and schematized diagram after evaluating the mechanical toughness, cell seeding efficiency, rate of cell proliferation, and consumption-related transcription factors for Examples 1 to 3 and Comparative Example 2 and shows the respective optical images. In addition, the values obtained by dividing the four evaluation items by their maximum values are shown in a table in the bottom of FIG. 13. In particular, it was confirmed that in the case of Example 3 mixed with 60% of bioglass based on the total weight of the composite scaffold, the intrinsic brittleness problem was not overcome due to low mechanical toughness. On the other hand, it was confirmed that in the case of Example 2 mixed with 40% of bioglass based on the total weight of the composite scaffold, the intrinsic brittleness problem was overcome due to its excellent biological activity and excellent mechanical toughness.

From the above, it was confirmed that the composition of Example 2 having 40% of bioglass content based on the total weight of the composite scaffold could be most suitably used as a 3D printer molded article which was a composite scaffold having excellent toughness and biological activity in the medical/biotechnological fields.

It should be appreciated that all the simple modifications and variations of the present invention are within the scope of the present invention, and the specific scope of the present invention to be protected will be defined by the appended claims.

The invention claimed is:

1. A composition for a fused deposition modeling (FDM) 3D printer comprising:
 a crystallized bioglass and a biocompatible polymer resin,
 wherein the composition includes 30 to 50% by weight of the crystallized bioglass and 50 to 70% by weight of the biocompatible polymer resin based on a total weight of the composition, and
 wherein the crystallized bioglass is obtained by a sintering comprising a heating step and a cooling step,
 wherein the crystallized bioglass comprises CaO, $SiO_2$, $P_2O_5$ and $B_2O_3$.

2. The composition for the FDM 3D printer according to claim 1, wherein the biocompatible polymer resin comprises one selected from the group consisting of poly(ε-caprolactone) (PCL), polyethylene (PE), poly(methyl methacrylate) (PMMA), poly lactic acid (PLA), poly-L-lactic acid (PLLA), polyglycolide (PGA), poly lactic-co-glycolic acid (PLGA), polyvinyl chloride (PVC), polytetrafluoroethylene (PTFE), polyethylene terephthalate (PET), polyurethane, polyacetal, polyamide, polyamide elastomer, polyester, polyester elastomer, polypropylene, polyacrylonitrile, polysulfone, polyorthoester, polyanhydride, chitosan, gelatin, collagen, and a combination thereof.

* * * * *